United States Patent
Iwai et al.

(10) Patent No.: US 9,852,345 B2
(45) Date of Patent: Dec. 26, 2017

(54) ACTIVITY MAP CREATING DEVICE, ACTIVITY MAP CREATING SYSTEM, AND ACTIVITY MAP CREATING METHOD

(71) Applicant: PANASONIC INTELLECTUAL PROPERTY MANAGEMENT CO., LTD., Osaka (JP)

(72) Inventors: Kazuhiko Iwai, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

(21) Appl. No.: 14/579,092

(22) Filed: Dec. 22, 2014

(65) Prior Publication Data

US 2015/0187088 A1 Jul. 2, 2015

(30) Foreign Application Priority Data

Dec. 27, 2013 (JP) ................. 2013-270927

(51) Int. Cl.
G09G 5/00 (2006.01)
G06K 9/00 (2006.01)
G06T 11/20 (2006.01)

(52) U.S. Cl.
CPC ........ G06K 9/00771 (2013.01); G06T 11/206 (2013.01)

(58) Field of Classification Search
None
See application file for complete search history.

(56) References Cited

U.S. PATENT DOCUMENTS

2002/0057840 A1* 5/2002 Belmares .............. G06T 7/2053
382/218
2003/0228128 A1* 12/2003 Taylor ............... G06F 17/30811
386/226

(Continued)

FOREIGN PATENT DOCUMENTS

| JP | 2003-324726 A | 11/2003 |
|---|---|---|
| JP | 2009-134688 | 6/2009 |
| JP | 2011-248836 | 12/2011 |

OTHER PUBLICATIONS

Khan et al. (Tracking Multiple Occluding People by Localizing on Multiple Scene Planes, IEEE, vol. 31, No. 3 Mar. 2009).*

(Continued)

*Primary Examiner* — Kyle Zhai
(74) *Attorney, Agent, or Firm* — Greenblum & Bernstein, P.L.C.

(57) ABSTRACT

An activity map creating device creates an activity situation of a moving object, and outputs an activity map visualizing the activity situation of the moving object. The device includes a moving object detector that detects the moving object from a captured image, and a first activity value obtainer that obtains a moving object activity value for each of a plurality of detection elements. The device further includes a target area setter that sets a target area, a second activity value obtainer that aggregates, in the target area, moving object activity values of the respective detection elements, and a map generator that creates the activity map for the target area based on the aggregation. The device further includes an output information generator that creates output information on the activity map.

14 Claims, 22 Drawing Sheets

(56) References Cited

U.S. PATENT DOCUMENTS

2007/0248244 A1* 10/2007 Sato ................. G06F 17/30265
　　　　　　　　　　　　　　　　　　382/103
2009/0134968 A1　 5/2009 Girgensohn et al.
2013/0091432 A1* 4/2013 Shet ................. G08B 13/19645
　　　　　　　　　　　　　　　　　　715/719

OTHER PUBLICATIONS

U.S. Appl. No. 14/613,612 to Hirofumi Fujii et al., filed Feb. 4, 2015.

* cited by examiner

FIG. 8

Color table

| Color management number | R | G | B | | Counter upper limit | |
|---|---|---|---|---|---|---|
| | | | | | 500 | 10 |
| 000 | XXX | XXX | XXX | ◄--- | 1 | 1 |
| 001 | XXX | XXX | XXX | ◄--- | 2 | - |
| 002 | XXX | XXX | XXX | ◄--- | 3 | - |
| ⋮ | ⋮ | ⋮ | ⋮ | | ⋮ | ⋮ |
| 049 | XXX | XXX | XXX | ◄--- | 50 | 2 |
| ⋮ | ⋮ | ⋮ | ⋮ | | ⋮ | ⋮ |
| 099 | XXX | XXX | XXX | ◄--- | 100 | 3 |
| ⋮ | ⋮ | ⋮ | ⋮ | | ⋮ | ⋮ |
| 129 | XXX | XXX | XXX | ◄--- | 130 | - |
| ⋮ | ⋮ | ⋮ | ⋮ | | ⋮ | ⋮ |
| 499 | XXX | XXX | XXX | ◄--- | 500~ | 10~ |

ACTIVITY MAP CREATING DEVICE, ACTIVITY MAP CREATING SYSTEM, AND ACTIVITY MAP CREATING METHOD

BACKGROUND OF THE INVENTION

1. Field of the Invention

The present disclosure relates to an activity map creating device, an activity map creating system, and an activity map creating method for analyzing an activity situation of a moving object in a monitoring area, and outputting an activity map which visualizes the activity situation of the moving object.

2. Description of the Related Art

A monitoring system has been widely used in stores such as convenience stores. This monitoring system monitors persons present in a store through inspection of images of the persons captured by a camera provided in the store for capturing images of the inside of the store. Sales and profits of stores can increase when measures are taken for improving display methods of commodities in stores, for example, based on recognition of activity situations of customers in stores through the images captured by the camera.

Unexamined Japanese Patent Publication No. 2009-134688 discloses a technology for creating an activity map which visualizes activity situations of persons in a monitoring area. The technology disclosed in Unexamined Japanese Patent Publication No. 2009-134688 displays such an activity map which has color classifications in the shape of contours determined in accordance with degrees of activities of persons.

Unexamined Japanese Patent Publication No. 2011-248836 discloses a technology which divides a monitoring area into a plurality of blocks, and detects a degree of presence of a person for each of the blocks. The technology disclosed in Unexamined Japanese Patent Publication No. 2011-248836 is configured to output a value (score) indicating a degree of presence of a person for each block.

SUMMARY OF THE INVENTION

An activity map creating device according to an exemplary embodiment of the present disclosure creates an activity situation of a moving object in a monitoring area, and outputs an activity map visualizing the activity situation of the moving object. The activity map creating device includes a moving object detector that detects the moving object from a captured image of the monitoring area, and a first activity value obtainer that obtains a moving object activity value indicating the degree of activity of the moving object for each of predetermined detection elements plurally divided from the captured image based on detection results of the moving object detector. The activity map creating device further includes a target area setting unit that sets a target area in the monitoring area in accordance with input operation by a user, a second activity value obtainer that aggregates, in the target area, moving object activity values of the respective detection elements obtained by the first activity value obtainer to obtain a moving object activity value for the target area based on the aggregation, and a map generator that creates the activity map for the target area based on the moving object activity value of the target area obtained by the second activity value obtainer. The activity map creating device further includes an output information creating unit that creates output information on the activity map created by the map generator.

This configuration outputs the activity map based on the moving object activity value for the target area set in the monitoring area in accordance with input operation by the user. Accordingly, this configuration allows rapid recognition of the activity situation of the moving object in an area noted by the user within the monitoring area.

BRIEF DESCRIPTION OF THE DRAWINGS

FIG. 8 is a diagram illustrating a color table used for an activity map creating process executed by map generator 35;

DETAILED DESCRIPTION OF THE PREFERRED EMBODIMENTS

Figure 1:
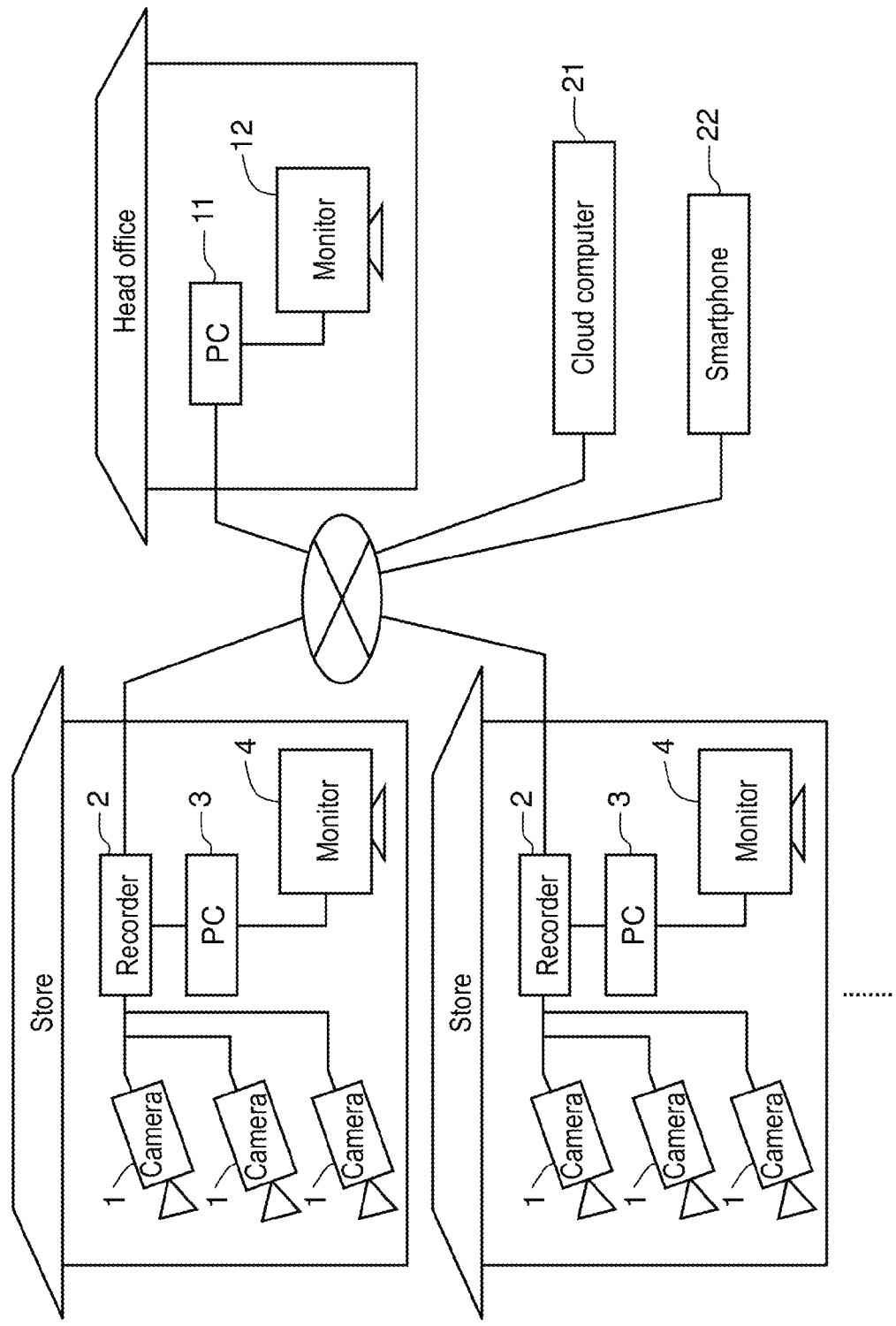
FIG. 1 is a general block diagram of an activity map creating system according to a first exemplary embodiment.

An activity map creating device according to an exemplary embodiment of the present disclosure creates an activity situation of a moving object in a monitoring area, and outputs an activity map visualizing the activity situation of the moving object. The activity map creating device includes a moving object detector that detects the moving object from a captured image of the monitoring area, and a first activity value obtainer that obtains a moving object activity value indicating the degree of activity of the moving object for each of predetermined detection elements plurally divided from the captured image based on detection results of the moving object detector. The activity map creating device further includes a target area setting unit that sets a target area within the monitoring area in accordance with input operation by a user, a second activity value obtainer that aggregates, in the target area, moving object activity values of the respective detection elements obtained by the first activity value obtainer to obtain a moving object activity value for the target area, and a map generator that creates the activity map for the target area based on the moving object activity value of the target area obtained by the second activity value obtainer. The activity map creating device further includes an output information creating unit that creates output information on the activity map created by the map generator.

This configuration outputs the activity map based on the moving object activity value for the target area set in the monitoring area in accordance with input operation by the user. Accordingly, this configuration allows rapid recognition of the activity situation of the moving object in an area noted by the user in the monitoring area.

The moving object detector of the activity map creating device according to the exemplary embodiment of the present disclosure is configured to obtain a moving object frame representing an area where the moving object detected from the captured image of the monitoring area is present. The first activity value obtainer is configured to count the number of times of presence of each of the detection elements within a setting range based on the moving object frame obtained by the moving object detector to obtain a moving object activity value for each of the detection elements.

This configuration provides a moving object activity value for each of the detection elements by simplified processing.

An activity map creating device according to an exemplary embodiment of the present disclosure creates an activity situation of a moving object in a monitoring area, and outputs an activity map visualizing the activity situation of the moving object. The activity map creating device includes a moving object detector that detects the moving body from a captured image of the monitoring area, an activity value obtainer that obtains a moving object activity value indicating the degree of activity of the moving object in the monitoring area based on detection results of the moving object detector, and a map generator that creates the activity map based on the moving object activity value obtained by the activity value obtainer. The activity map creating device further includes a target area setting unit that sets a target area within the monitoring area in accordance with input operation by a user, and a transition information creating unit that creates transition information on a transition of the moving object activity value for the target area based on the moving object activity value obtained by the activity value obtainer. The activity map creating device further includes an output information creating unit that creates output information on the activity map created by the map generator, and the transition information obtained by the transition information creating unit.

This configuration outputs the transition information on a transition of the moving object activity value for the target area, thereby allowing rapid recognition of a change of the activity situation of the moving object with an elapse of time. Moreover, this configuration outputs the activity map, thereby allowing rapid recognition of the activity situation of the moving object in a particular period. Furthermore, this configuration creates both the activity map and the transition information as materials for consideration, thereby allowing recognition of the activity situation of the moving object in the monitoring area from diversified viewpoints.

The target area setting unit of the activity map creating device according to the exemplary embodiment of the present disclosure is configured to set the target area in units of grid corresponding to each of a plurality of grids in square block shapes divided from the captured image in accordance with input operation by the user.

This configuration sets the target area in units of grid, thereby facilitating designation of the target area. In this case, it is preferable that grids are divided in accordance with input operation by the user for designating the division numbers in the horizontal and vertical directions.

The map generator of the activity map creating device according to the exemplary embodiment of the present disclosure is configured to create the activity map in the units of grid set as the target area.

This configuration allows rapid recognition of the activity situation of the moving object in an area particularly noted by the user in the monitoring area.

The map generator of the activity map creating device according to the exemplary embodiment of the present disclosure is configured to create the activity map in units of pixel of the captured image.

This configuration allows detailed recognition of the activity situation of the moving object within the monitoring area.

The target area setting unit of the activity map creating device according to the exemplary embodiment of the present disclosure is configured to set the target area in an arbitrary shape designated by the user in accordance with input operation by the user.

This configuration sets the target area in an arbitrary shape designated by the user, thereby allowing setting of the target area in an optimum shape in accordance with the actual situation of the monitoring area.

The activity value obtainer of the activity map creating device according to the exemplary embodiment of the present disclosure obtains a moving object activity value for each of predetermined detection unit periods. The transition information creating unit is configured to average the moving object activity values of the respective detection unit periods for each of aggregation unit periods to obtain a moving object activity value for each of the aggregation unit periods, and create the transition information on a transition of the moving object activity value for each of the aggregation unit periods.

This configuration easily obtains a moving object activity value for each of arbitrary aggregation unit periods (such as date, week, and month) based on the moving object activity values for every given detection unit periods (e.g one hour). Accordingly, this configuration provides a variety of transition information by varying the aggregation unit periods, allowing recognition of changes of the degree of activity of the moving object from multiple viewpoints.

The transition information creating unit of the activity map creating device according to the exemplary embodiment of the present disclosure is configured to create the transition information on transitions of moving object activity values for the plurality of target areas as accumulated values.

This configuration displays transitions of moving object activity values for the plurality of target areas as accumulated values. Accordingly, this configuration allows rapid recognition of changes of the activity situation of the moving object with an elapse of time in a plurality of target areas in an integrated manner.

The output information creating unit of the activity map creating device according to the exemplary embodiment of the present disclosure creates the output information on an analysis result output screen displayed on a display device. The analysis result output screen includes a map display portion that displays the activity map, and an operation portion that adjusts date and time of the activity map displayed in the map display portion in accordance with operation by the user.

This configuration adjusts the date and time of a map image displayed on the map display portion, thereby facilitating viewing of an activity map for a desired date and time. Moreover, the activity map switches to another map with time and date by successive operation of the operation portion. Accordingly, this configuration allows rapid recognition of changes of the activity situation of the moving object.

The output information creating unit of the activity map creating device according to the exemplary embodiment of the present disclosure is configured to create the output information including a map image that displays the activity map overlapped on the captured image of the monitoring area, and a graph image that displays a graph corresponding to the transition information. The map image and the graph image are arranged side by side.

This configuration displays the activity map overlapped on the captured image of the monitoring area. Accordingly, this configuration allows checking of the activity situation of the moving object in comparison with the actual situation of the monitoring area shown in the captured image. Moreover, this configuration displays the transition of the moving object activity values on the graph. Accordingly, this configuration further facilitates recognition of changes of the moving object activity values with time. Furthermore, in this configuration, the map image and the graph image are arranged side by side. Accordingly, this configuration facilitates comparison between the activity map and the graph, thereby allowing easy recognition of the activity situation of the moving object within the monitoring area from diversified viewpoints.

An activity map creating system according to an exemplary embodiment of the present disclosure creates an activity situation of a moving object in a monitoring area, and outputs an activity map visualizing the activity situation of the moving object. The activity map creating system includes a camera that captures an image of the monitoring area, and a plurality of information processing devices. Any one of the plurality of information processing devices includes a moving object detector that detects the moving object from a captured image of the monitoring area, a first activity value obtainer that obtains a moving object activity value indicating the degree of activity of the moving object for each of predetermined detection elements plurally divided from the captured image based on detection results of the moving object detector, a target area setting unit that sets a target area within the monitoring area in accordance with input operation by a user, a second activity value obtainer that aggregates, in the target area, moving object activity values for the respective detection elements obtained by the first activity value obtainer to obtain a moving object activity value for the target area, a map generator that creates the activity map for the target area based on the moving object activity value of the target area obtained by the second activity value obtainer, and an output information creating unit that creates output information on the activity map created by the map generator.

This configuration allows rapid recognition of the activity situation of the moving object in an area particularly noted by the user within the monitoring area.

An activity map creating system according to an exemplary embodiment of the present disclosure includes a camera that captures an image of a monitoring area, and a plurality of information processing devices. Any one of the plurality of information processing devices includes a moving object detector that detects the moving object from a captured image of the monitoring area, an activity value obtainer that obtains a moving object activity value indicating the degree of activity of the moving object in the monitoring area based on detection results of the moving object detector, a map generator that creates the activity map based on the moving object activity value obtained by the activity value obtainer, a target area setting unit that sets a target area in the monitoring area in accordance with input operation by a user, a transition information creating unit that creates transition information on a transition of the moving object activity value for the target area based on the moving object activity value obtained by the activity value obtainer, and an output information creating unit that creates output information having the activity map created by the map generator, and the transition information obtained by the transition information creating unit.

This configuration allows rapid recognition of a change of the activity situation of the moving object with an elapse of time.

An activity map creating method according to an exemplary embodiment of the present disclosure executes a process for analyzing an activity situation of a moving object in a monitoring area, and outputting an activity map visualizing the activity situation of the moving object. The activity map creating method includes detecting a moving object from a captured image of the monitoring area, obtaining a moving object activity value indicating the degree of activity of the moving object for each of predetermined detection elements plurally divided from the captured image based on detection results thus obtained, setting a target area in the monitoring area in accordance with input operation by a user, aggregating, in the target area, moving object activity values of the respective detection elements to obtain a moving object activity value for the target area, creating the activity map for the target area based on the moving object activity value of the target area thus obtained, and creating output information on the activity map thus created.

This configuration allows rapid recognition of the activity situation of the moving object in an area particularly noted by the user within the monitoring area.

An activity map creating method according to an exemplary embodiment of the present disclosure includes detecting a moving object from a captured image of a monitoring area, obtaining a moving object activity value indicating the degree of activity of the moving object in the monitoring area based on detection results thus obtained, creating the activity map based on the moving object activity value thus obtained, setting a target area in the monitoring area in accordance with input operation by a user, creating transition information on a transition of the moving object activity value for the target area based on the moving object activity value, and creating output information on the activity map and the transition information.

This configuration allows rapid recognition of a change of the activity situation of the moving object with an elapse of time.

Exemplary embodiments according to the present disclosure are hereinafter described with reference to the drawings.

(First Exemplary Embodiment)

FIG. 1 is a general block diagram of an active map analyzing system according to a first exemplary embodiment. This activity map creating system is constructed while targeted to retail chain stores such as convenience stores. The activity map creating system includes cameras (imaging devices) 1, recorder (image recording device) 2, PC (activity map creating device) 3, and monitor (display device) 4, which are provided in each of a plurality of stores, and PC (activity map creating device) 11, and monitor (display device) 12, which are provided in a head office managing the plurality of stores.

Cameras 1 are installed at appropriate positions in each of the stores. Images of the store are captured by cameras 1, and image information obtained from the images is recorded on recorder 2. PC 3 provided in the store and PC 11 provided in the head office allow real-time inspection of images of the inside of the store captured by cameras 1, and inspection of previous images of the inside of the store recorded on recorder 2. Accordingly, condition check of the inside of the store is achievable both in the store and in the head office.

PC 3 provided in the store is configured to function as an activity map creating device which creates activity situations of customers in the store. Analysis result information created by PC 3 may be inspected on PC 3, or may be transmitted to PC 11 provided in the head office for inspection on PC 11. Accordingly, both PCs 3 and 11 are configured to function as inspection devices for inspecting analysis result information.

Figure 2A:
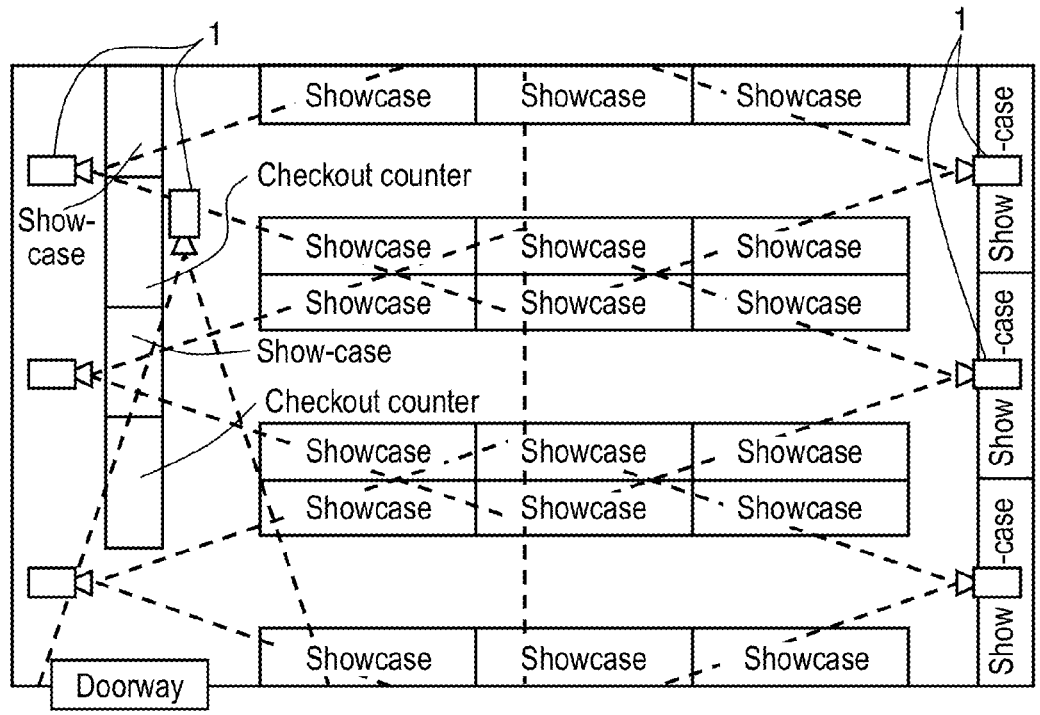
FIG. 2A is a plan view of a store, illustrating the layout of the store and the installation condition of cameras 1.
Figure 2B:
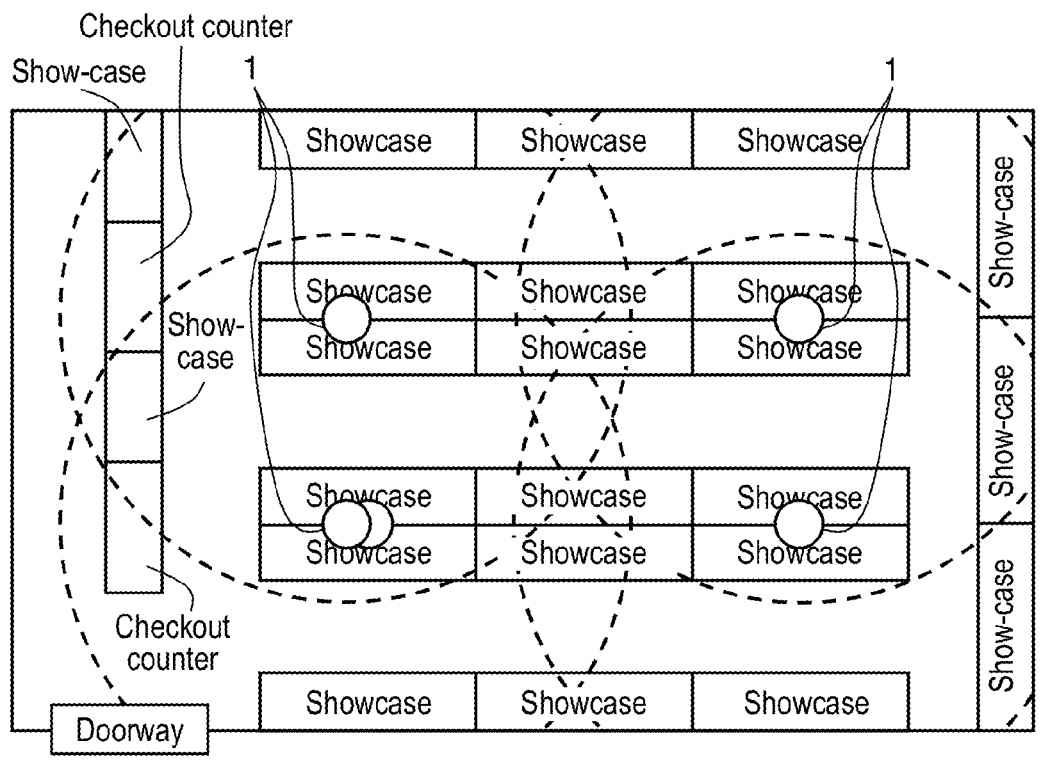
FIG. 2B is a plan view of a store, illustrating the layout of the store and the installation condition of cameras 1.

The layout of the store and the installation condition of cameras 1 are now discussed on the assumption that the store is a convenience store. FIGS. 2A and 2B are plan views illustrating the layout of the store and the installation condition of cameras 1.

There are provided a doorway, showcases (display areas), and checkout counters in the store. Lunch boxes, plastic bottles, rice balls and other commodities are placed on the respective showcases while divided for each category of the commodities. Showcases for fast food are provided adjacent to the checkout counters. A customer enters the store through the doorway, and moves within the store along passages formed between the showcases. When finding a desired commodity, the customer brings the commodity to one of the checkout counters, settles the account (pays the bill) at the checkout counter, and then leaves the store through the doorway.

There are further provided a plurality of cameras 1 for capturing images of the inside of the store (monitoring area). In the example shown in FIG. 2A, in particular, cameras 1 are constituted by so-called box cameras having a particular angle of view, and provided on the ceiling at the ends of the respective passages to capture images of the passages between the showcases. According to the example shown in FIG. 2B, cameras 1 are constituted by omni-directional cameras having an imaging range of 360 degrees using a fish-eye lens, and provided on the ceiling immediately above the showcases to capture images of the passages between the showcases.

Figure 3:
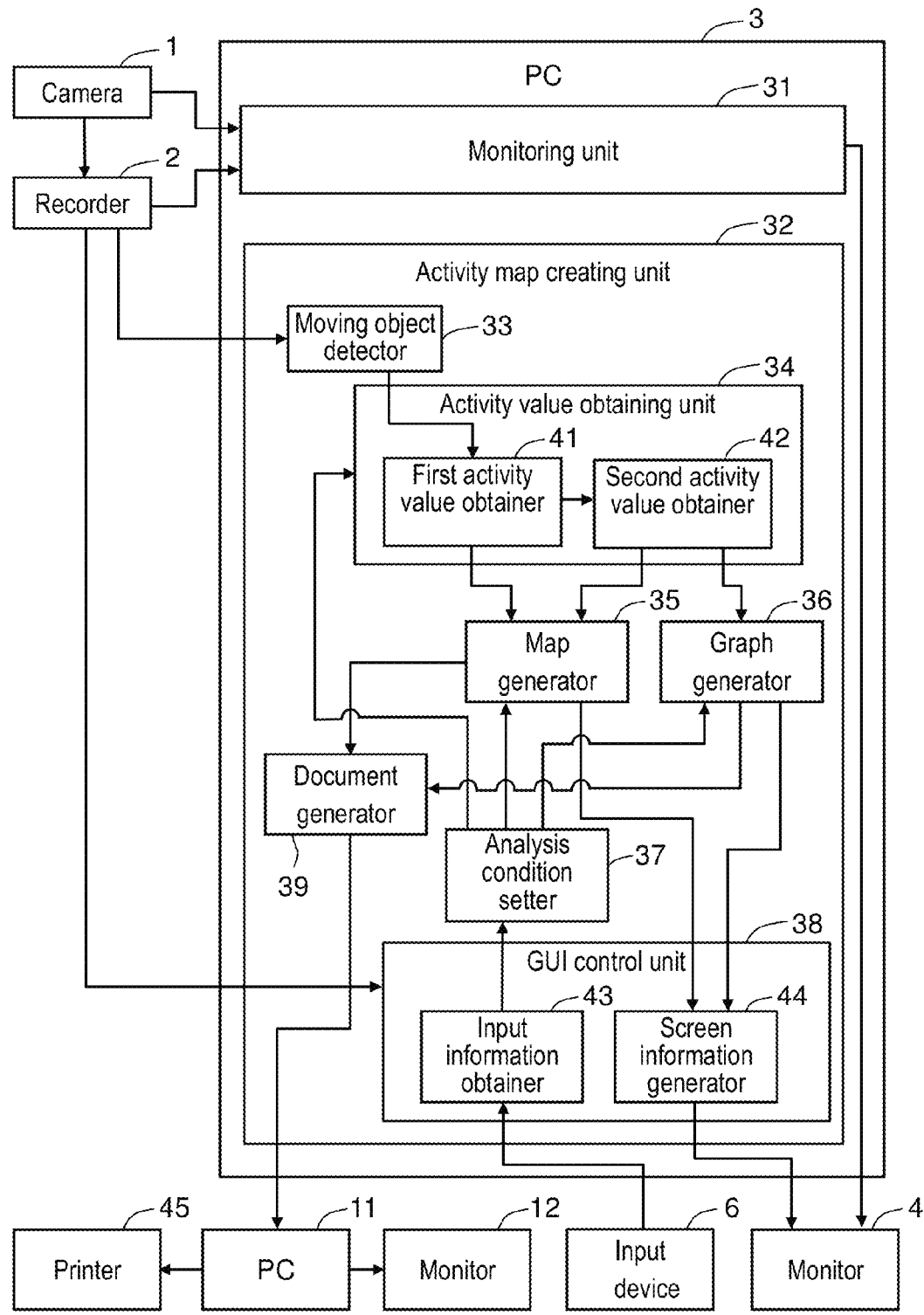
FIG. 3 is a function block diagram illustrating the general structure of PC 3.
Figure 4:
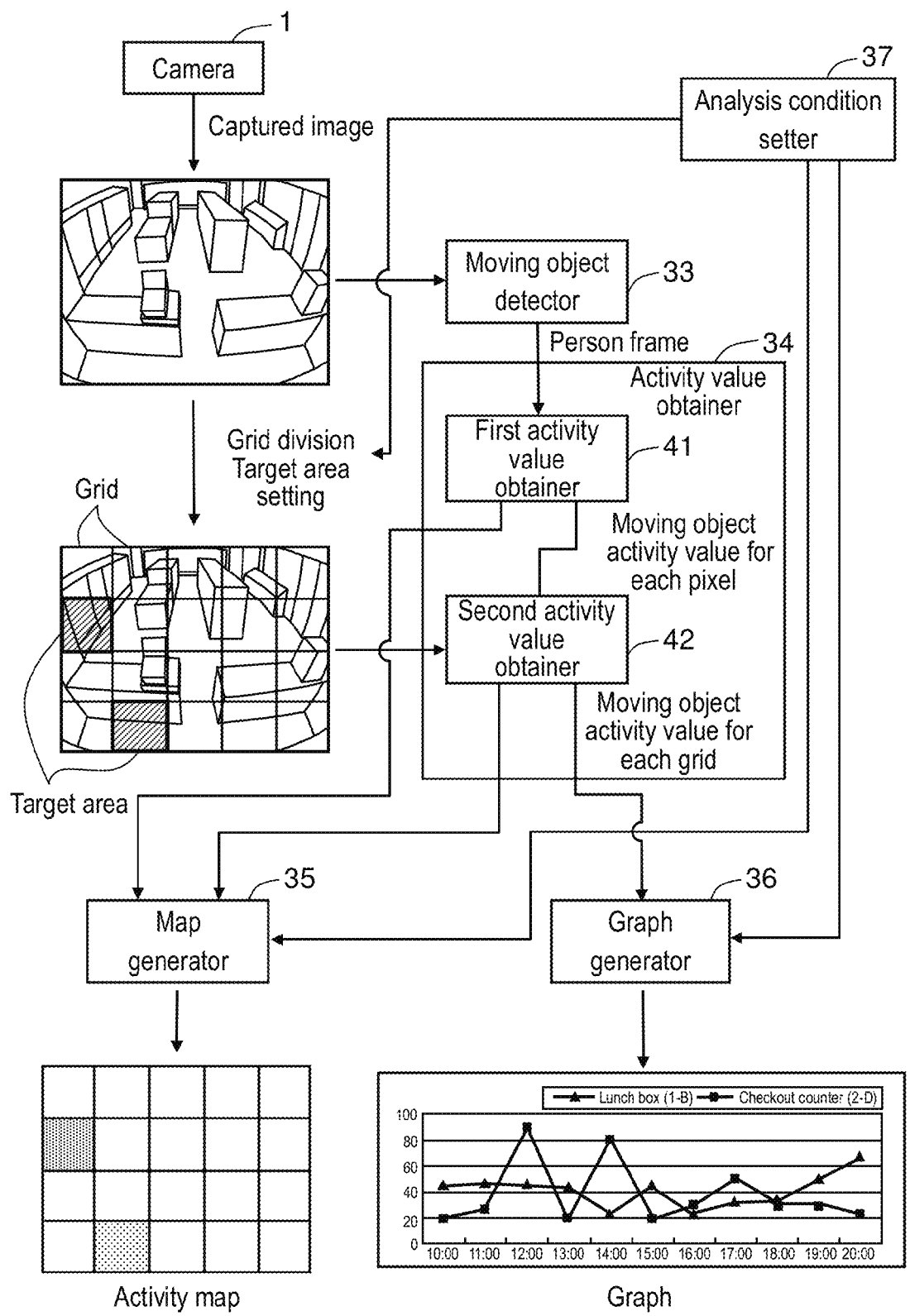
FIG. 4 is a diagram illustrating the outline of an activity map creating process executed by PC 3.

The outline of an activity map creating process executed by PC 3 illustrated in FIG. 1 is now described. FIG. 3 is a function block diagram illustrating the general configuration of PC 3. FIG. 4 is a diagram illustrating the outline of the activity map creating process executed by PC 3.

As illustrated in FIG. 3, PC 3 includes monitoring unit 31, and activity map creating unit 32. Monitoring unit 31 provides for PC 3 a function as a monitoring system for monitoring the inside of the store. Monitoring unit 31 controls operations of cameras 1 and recorder 2, and allows real-time inspection of images of the inside of the store captured by cameras 1, and inspection of images of the inside of the store recorded on recorder 2.

Activity map creating unit 32 creates an activity situation of a person (moving object) in the monitoring area, and outputs an activity map which visualizes the activity situation of the person. Activity map creating unit 32 includes moving object detector 33, activity value obtainer 34, map generator 35, graph generator (transition information creating unit) 36, analysis condition setter 37, GUI control unit 38, and document generator 39.

Analysis condition setter (target area setting unit) 37 executes a process for urging a user to carry out input operation for designating an area particularly noted by the user within the monitoring area as a target area, and setting the target area as analysis conditions in accordance with the input operation by the user.

According to this exemplary embodiment, in particular, the target area may be set in units of grid corresponding to each of grids in the shape of square blocks divided from a captured image as illustrated in FIG. 4. In this case, the captured image is divided in accordance with the input operation by the user, and the number of the grid divisions in dividing the captured image into grids is set as analysis conditions. The grids are divided into equal divisions in accordance with a grid division number.

In addition, analysis condition setter 37 sets units for display of the activity map (pixels and grids), and a counter upper limit value as analysis conditions in accordance with the input operation by the user. Furthermore, analysis condition setter 37 sets aggregation modes of date, week, month, and day of week in accordance with input operation by the user for designating the respective aggregation modes.

Moving object detector 33 executes a process for detecting a person from images of the monitoring area captured by cameras 1. According to this exemplary embodiment, in particular, moving object detector 33 executes a process for obtaining a person frame (moving object frame) indicating an area where the person is present. The moving object detecting process executed by moving object detector 33 may be performed by using a known technology for detecting persons, for example. Based on the person frame, the inside of the person frame, the upper body of the person frame, or the floor surface near the person frame is designated as a setting range for a moving object activity value obtaining process described later.

Activity value obtainer 34 is a unit which obtains moving object activity values indicating degrees of activity of the person in the monitoring area based on the detection result of the moving object detector 33, and includes first activity value obtainer 41 and second activity value obtainer 42.

First activity value obtainer 41 executes a process for obtaining a moving object activity value indicating a degree of activity of a person for each pixel (detection element) based on the detection result of moving object detector 33. Specifically, first activity value obtainer 41 counts the number of times of presence of each pixel of a camera image in the setting range of the inside of the person frame, the upper body of the person frame, or the floor surface near the person frame obtained by moving object detector 33 to obtain a moving object activity value (counter value) for each pixel.

Second activity value obtainer 42 executes a process for aggregating the moving object activity values of the respective pixels obtained by first activity value obtainer 41 for each unit of grids set as target areas to obtain a moving object activity value for each unit of grids. According to this exemplary embodiment, in particular, second activity value obtainer 42 averages the moving activity values of the plurality of pixels positioned within each grid to obtain the moving object activity value for each unit of grids.

Map generator 35 executes a process for creating an activity map which visualizes an activity situation of the person in the monitoring area based on the moving object activity values obtained by activity value obtainer 34. According to this exemplary embodiment, in particular, an activity map is created in units of pixel based on a moving object activity value for each pixel obtained by first activity value obtainer 41. In addition, an activity map is created in units of grid based on a moving object activity value for each unit of grids obtained by second activity value obtainer 42. According to this exemplary embodiment, an activity map is created only for grids set as target areas, and not created for grids not set as target areas.

Graph generator 36 executes a process for producing a graph (transition information) showing a transition (change with time) of moving object activity values for a grid set as a target area based on moving activity values for each unit of grids obtained by second activity value obtainer 42.

GUI (Graphical User Interface) control unit 38 illustrated in FIG. 3 executes a process for obtaining input information received by input operation from the user, and a process for outputting analysis results of activity map analysis via GUI using input device (input unit) 6 such as monitor 4 and a keyboard. GUI control unit 38 includes input information obtainer 43 and screen information generator (output information creating unit) 44.

Screen information generator 44 executes a process for creating display information on an analysis condition input screen to which the user inputs analysis conditions, and an analysis result output screen showing the analysis results of the activity map creating process. The analysis condition input screen and the analysis result output screen are displayed on monitor 4. Input information obtainer 43 executes a process for obtaining input information from the contents of input operation performed by the user on the analysis condition input screen or the analysis result output screen displayed on monitor 4 using input device 6. Analysis condition setter 37 executes a process for setting analysis conditions based on the input information obtained by input information obtainer 43.

Document generator (output information creating unit) 39 executes a process for creating an analysis result output document showing the analysis results of the activity map creating process in a predetermined file format. The analysis result output document created by document generator 39 is sent to a device other than PC 3 executing the activity map creating process, such as PC 11 provided in the head office, and displayed on monitor 12 connected with PC 11 or printed out by printer 45 connected to PC 11, for inspection of the analysis result output document.

Monitoring unit 31 and activity map creating unit 32 are realized under programs for inspection and activity map analysis executed by the CPU of PC 3. These programs may be provided to a user by being introduced beforehand to PC 3 as an information processing unit to be a dedicated device, by being recorded to an appropriate program recording medium as application programs operative on a general-purpose OS, or via a network.

Figure 5:
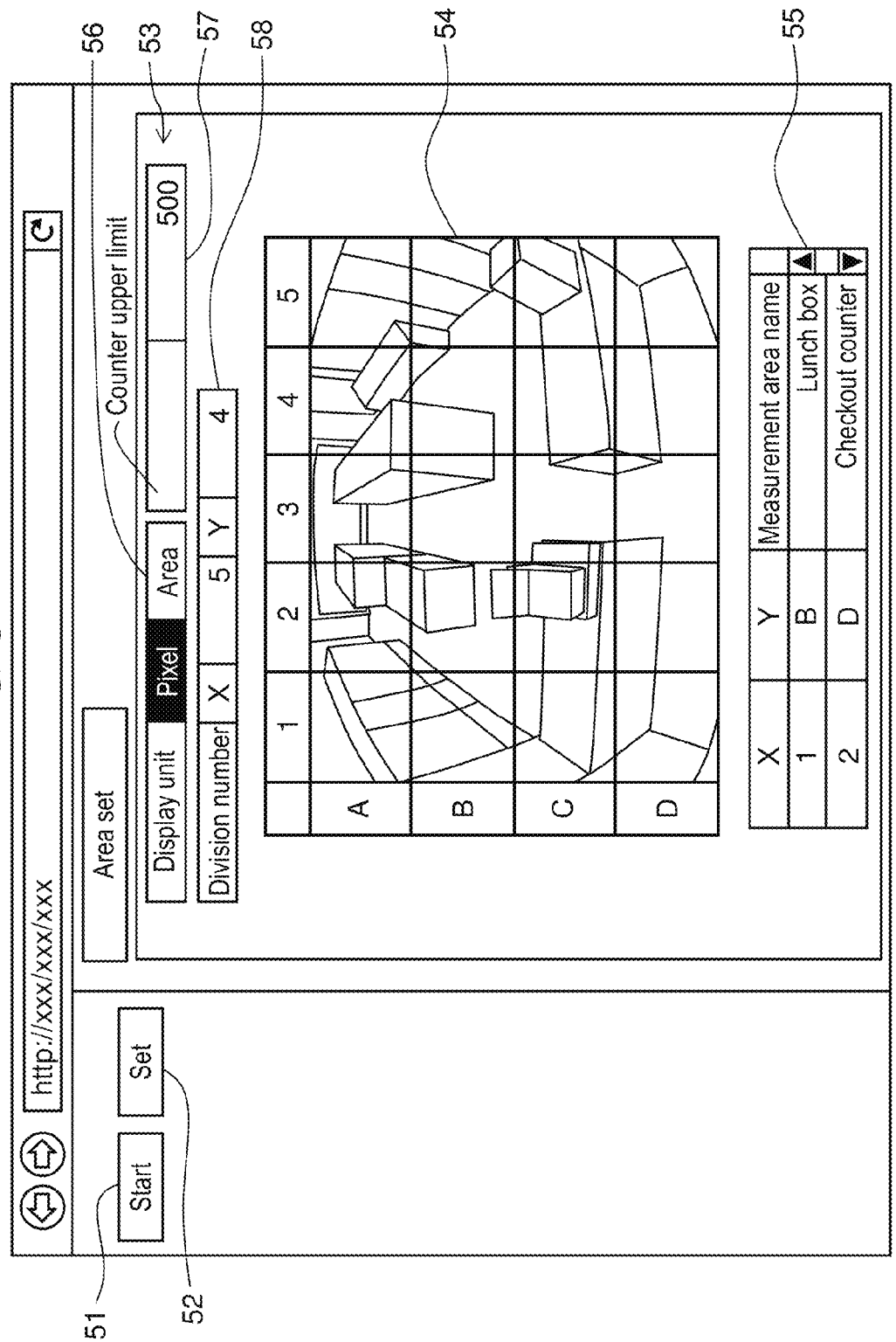
FIG. 5 is a diagram illustrating an analysis condition input screen displayed on monitor 4.
Figure 6:
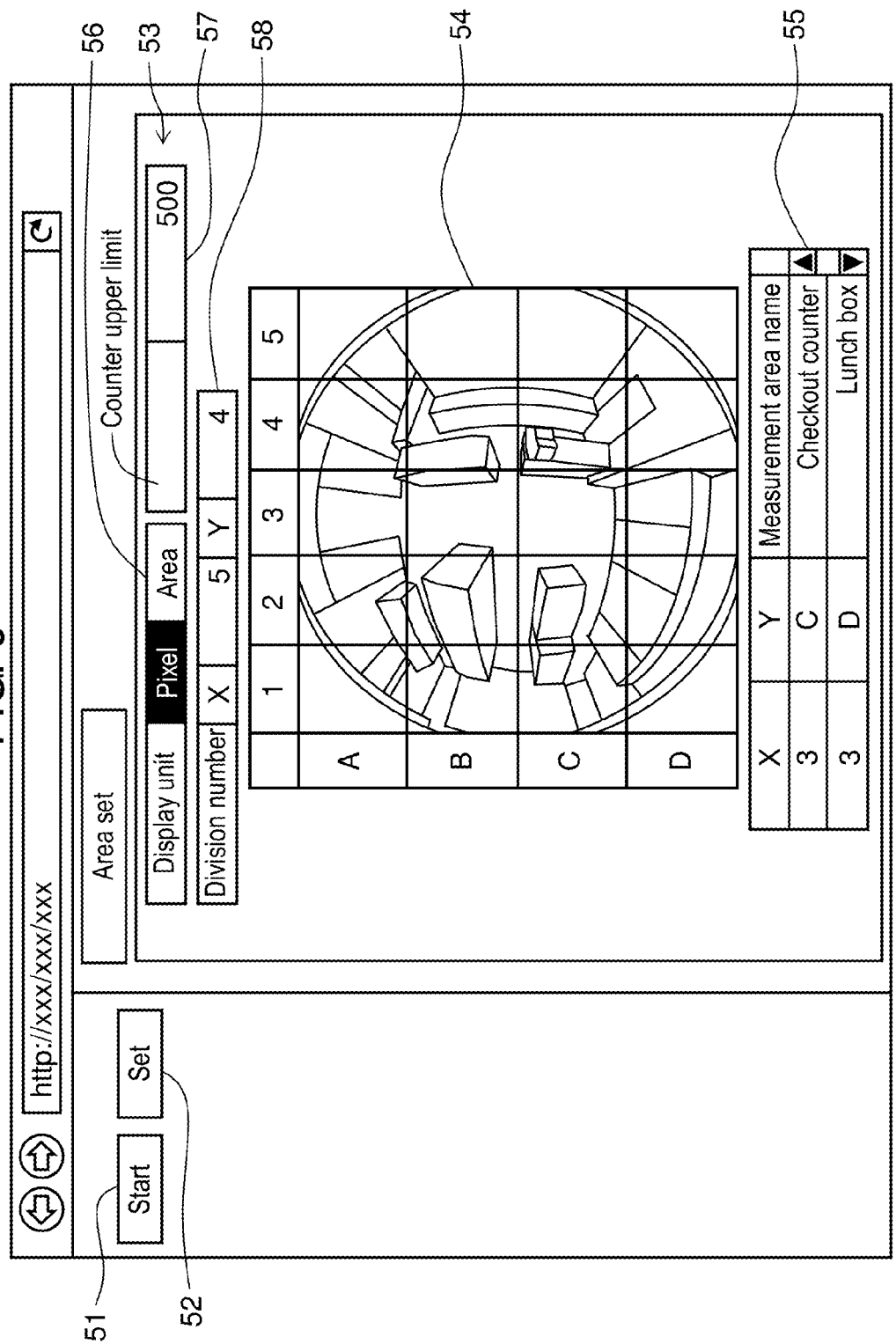
FIG. 6 is a diagram illustrating an analysis condition input screen displayed on monitor 4.

The analysis condition input screen which receives input of the analysis conditions for the activity map creating process executed by activity map creating unit 32 illustrated in FIG. 3 is described. FIGS. 5 and 6 are diagrams illustrating the analysis condition input screen displayed on monitor 4. FIG. 5 shows an example in which a box camera is used, and FIG. 6 shows an example in which an omnidirectional camera is used.

The analysis condition input screen illustrated in FIGS. 5 and 6 is a screen which receives, from the user, input of analysis conditions for the activity map analysis process executed by activity map creating unit 32. The analysis condition input screen includes start button 51, setting button 52, analysis condition input portion 53, division state display portion 54, and target area registration portion 55.

Start button 51 is a button for starting the activity map analysis process in activity map creating unit 32. Setting button 52 is a button for displaying analysis condition input portion 53, division state display portion 54, and target area registration portion 55 and for setting analysis conditions for the activity map creating process in accordance with operation by the user.

Analysis condition input portion 53 includes display unit selection portion 56, counter upper limit value input portion 57, and grid division number input portion 58.

Display unit selection portion 56 receives, from the user, input of selection of units for display of an activity map created by map generator 35. According to this exemplary embodiment, either a pixel or a grid is selectable as units for display. When a pixel is selected, an activity map is created in units of pixel of a captured image. When a grid is selected, an activity map is created in units of grid.

Counter upper limit value input portion 57 receives input of a counter upper value in the form of numerical values. This counter upper limit value may be input by input device 6 such as a keyboard. According to this exemplary embodiment, the counter upper value may be designated in the range from 10 to 500. The counter upper limit value imposes limitation only to display colors of the activity map. The counting with the person frame for each pixel executed by activity value obtainer 34 illustrated in FIG. 3 is carried out regardless of the counter upper limit value, as will be described in detail later.

Grid division number input portion 58 receives input of the division number of grids for dividing a captured image into the shape of square blocks. Grid division number input portion 58 includes an X-direction input column and a Y-direction input column. The division number in the X direction (horizontal direction) and the division number in the Y direction (vertical direction) are input in the respective columns. According to this exemplary embodiment, in particular, an arbitrary number in the range from 2 to 5 may be input as a division number.

Division state display portion 54 displays, on an image captured by camera 1, the division state of grids in correspondence with the division number input to grid division number input portion 58. Specifically, division lines of grids are displayed on the captured image. In the examples illustrated in FIGS. 5 and 6, the division number in the X direction is 5, and the division number in the Y direction is 4, so that the captured image is divided into 20 grids in total. Numerals (1, 2, 3, . . . ) are given to the grids in the X direction, and alphabets (A, B, C, . . . ) are given to the grids in the Y direction, so that the respective grids can be identified based on the two symbols in the horizontal and vertical directions.

Target area registration portion 55 registers grids displayed on division state display portion 54 as target areas. Target area registration portion 55 includes an X direction input column, a Y direction input column, and a name input column. A numerical symbol indicating a position of a grid in the X direction is input to the X direction input column. An alphabetical symbol indicating a position of a grid in the Y direction is input to the Y direction input column. A name of each target area is input to the name input column. The input may be performed by input device 6 such as a keyboard.

In the example illustrated in FIG. 5, grid 1-B showing an area of a showcase for lunch boxes, and grid 2-D showing an area of a checkout counter on the side of a store clerk are registered as target areas. In the example illustrated in FIG. 6, grid 3-C showing an area of a checkout counter on the customer side, and grid 3-D showing an area of a showcase for lunch boxes are registered as target areas.

Figure 7:
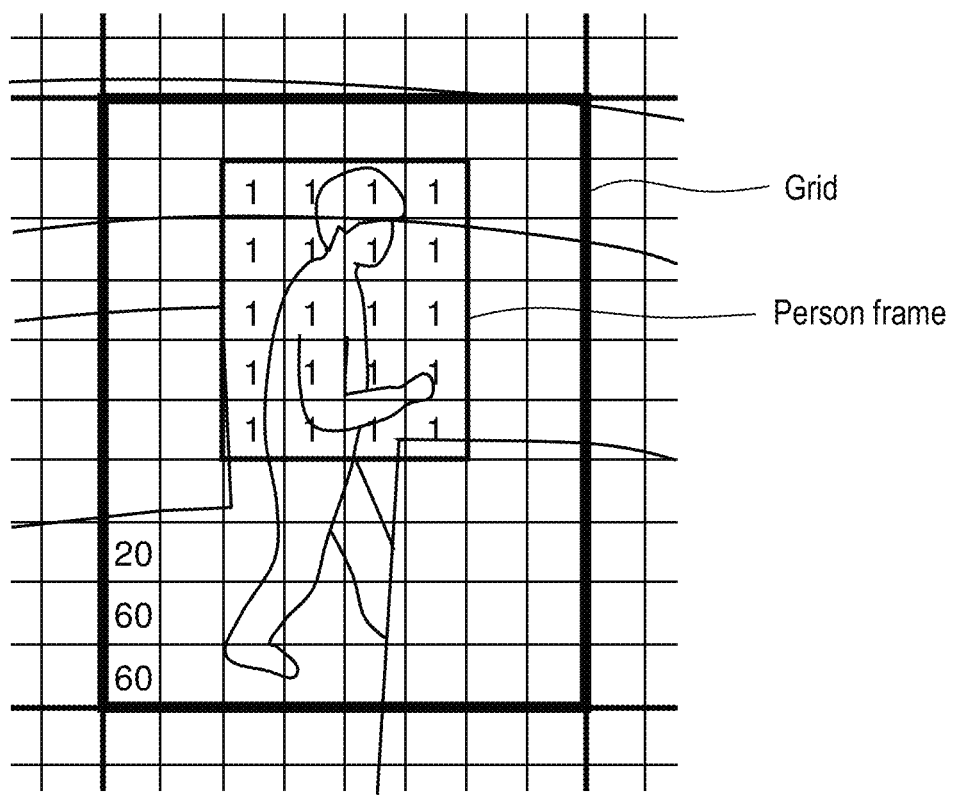
FIG. 7 is a diagram illustrating procedures of an activity value obtaining process executed by activity value obtainer 34.

An activity value obtaining process executed by activity value obtainer 34 illustrated in FIG. 3 is now described. FIG. 7 is a diagram illustrating procedures of the activity value obtaining process executed by activity value obtainer 34. The description is made on an example in which the number of times of presence of positions inside of a person frame is counted. However, as described above, the number of times of presence of positions may be counted by specifying positions in correspondence with the upper body of the person frame, or positions specified in correspondence with the floor surface near the person frame.

First activity value obtainer 41 of activity value obtainer 34 executes a process for obtaining a moving object activity value for each unit of pixels of a captured image. According to this exemplary embodiment, in particular, moving object detector 33 detects a person from a captured image (frame) in the monitoring area to obtain a person frame (moving object frame) indicating an area where the person is present. Then, first activity value obtainer 41 counts the number of times of presence of each pixel (detection element) in the person frame obtained by moving object detector 33, to obtain a moving object activity value (counter value) for each pixel.

The counting with the person frame for each pixel is performed for all pixels constituting the captured image. Every time each pixel enters the person frame, a counter value of the corresponding pixel is incremented by 1 as illustrated in FIG. 7. The counting with the person frame for respective pixels in this manner is continued for a predetermined detection unit period, and moving object activity values for respective units of pixels are sequentially output for every detection unit period. The moving object activity value (counter value) may be incremented by 1 when a predetermined number of times (such as three times) is continuously counted in the person frame, in consideration of detection errors of the person frame.

Second activity value obtainer 42 executes a process for aggregating the moving object activity values of the respective units of pixels obtained by first activity value obtainer 41 for each unit of grids to obtain a moving object activity value for each unit of grids. According to this exemplary embodiment, in particular, second activity value obtainer 42 determines an average value of the moving object activity values of the respective pixels within a grid, i.e., a value obtained by summing the moving object activity values of all the pixels within a grid and dividing the summed value by the pixel number of the grid, as a moving object activity value for the corresponding grid.

In the example illustrated in FIG. 7, each of the counter values of pixels positioned within the person frame is 1, while the moving object activity values of three pixels located in the lower left part of the diagram in the target area are 20, 60, and 60, respectively. Each of pixels to which no numeral is given has a moving object activity value of 0. Accordingly, the total value of the moving object activity values of all the pixels within the grid is calculated as (1×20)+60+60+20=160. Thus, the moving object activity value of the grid, i.e., the average value of the moving object activity values of the respective pixels within the grid is calculated as 160/(8×10)=2.

An activity map creating process executed by map generator 35 illustrated in FIG. 3 is now described. FIG. 8 is a diagram illustrating a color table used in the activity map creating process executed by map generator 35.

Map generator 35 executes a process for creating an activity map which visualizes an activity situation of a person based on moving object activity values obtained by activity value obtainer 34. According to this exemplary embodiment, in particular, map generator 35 creates an activity map having units for display (pixels or grids) each having a display color corresponding to the level of the moving object activity value.

In this case, the display color for each unit for display is determined with reference to the color table illustrated in FIG. 8. This color table has registrations of values for respective colors of R, G, and B for each of color management numbers (0 through 499). The color management numbers are given in correspondence with counter values (moving object activity values). For example, a warm display color is given to a large moving object activity value, while a cool display color is given to a small moving object activity value.

According to this exemplary embodiment, in particular, a counter upper limit value is input from the user to counter upper limit input portion 57 of the analysis condition input screen illustrated in FIGS. 5 and 6. In this case, color management numbers are given in accordance with this counter upper limit value. For example, assuming that the counter upper limit value is 500, all 500 colors registered in the color table are used. Specifically, when the counter value is equal to or larger than the upper limit value of 500, the display color is the color corresponding to the color management number of 499. On the other hand, when the counter value is 130, the display color is the color corresponding to the color management number of 129. When the counter value is 1, the display color is the color corresponding to the color management number of 000. When the counter value is 0, the display color is colorless.

When the counter upper limit value is set to 10, 10 colors included in 500 colors registered in the color table are used. For example, display colors of 000, 049, 099, and up to 499 are used for every 50 colors. Specifically, when the counter value is larger than the upper limit value of 10, the display color is the color corresponding to the color management number of 499. When the counter value is 1, the display color is the color corresponding to the color management number of 000. When the counter value is 0, the display color is colorless.

Figure 9:
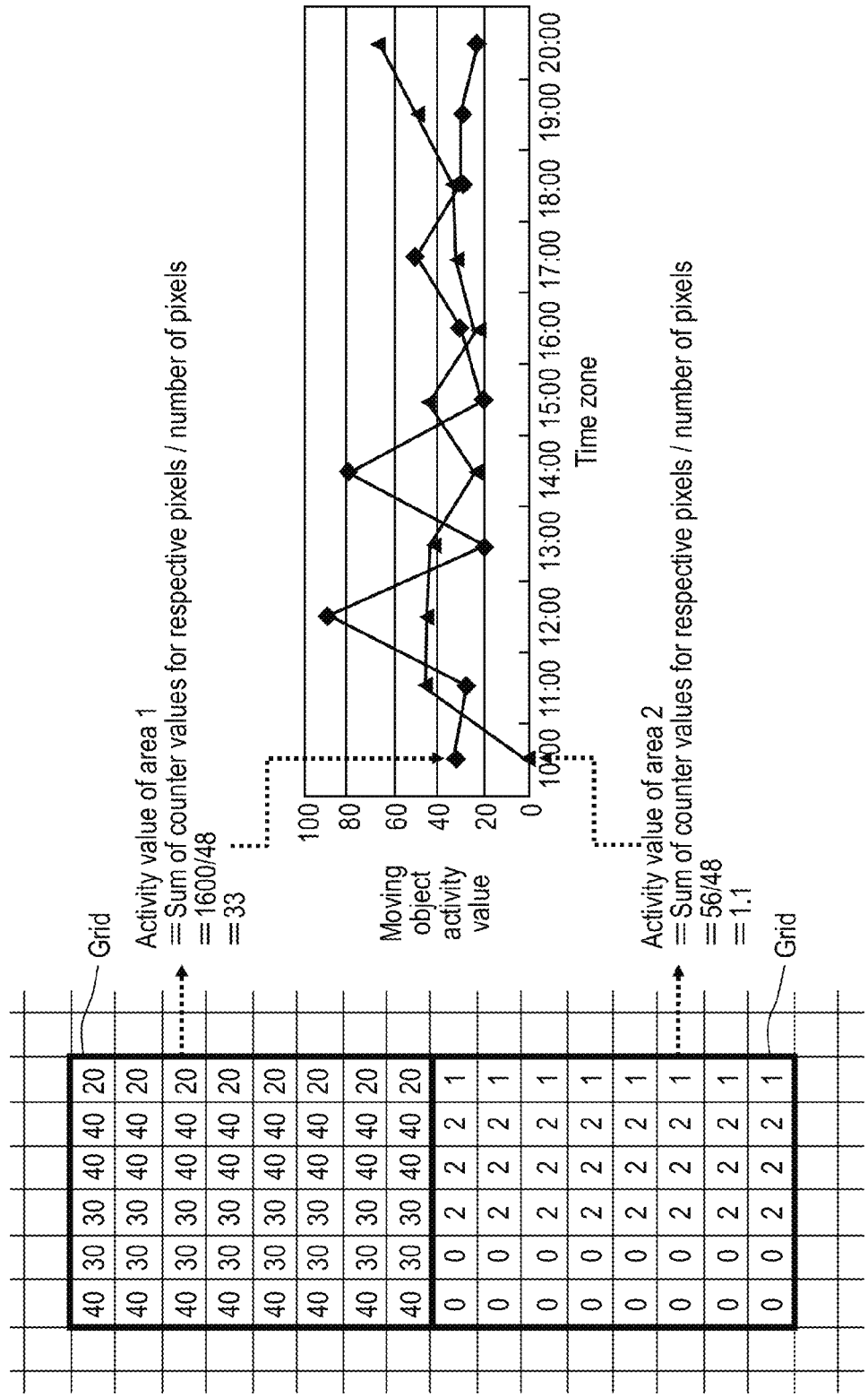
FIG. 9 is a diagram illustrating procedures for a graph creating process executed by graph generator 36.

A graph creating process executed by graph generator 36 illustrated in FIG. 3 is now described. FIG. 9 is a diagram illustrating procedures of the graph creating process executed by graph generator 36.

According to this exemplary embodiment, second activity value obtainer 42 executes a process for aggregating (averaging) moving object activity values of respective units of pixels obtained by first activity value obtainer 41 for each unit of grids to obtain a moving object activity value for each unit of grids. Then, graph generator 36 executes a process for creating a graph (transition information) on a transition of the moving object activity value for the grid set as the target area based on the moving object activity value for each unit of grids obtained by second activity value obtainer 42.

According to this exemplary embodiment, in particular, graph generator 36 creates a graph showing a transition of the moving object activity value for each grid set as the target area as illustrated in FIG. 9. In the example illustrated in FIG. 9, in particular, such a graph (line graph) is produced which divides business hours for a day into time zones (1 hour) and connects moving object activity values for the respective time zones in time series.

In addition, according to this exemplary embodiment, activity value obtainer 34 obtains moving object activity values for respective predetermined detection unit periods. Then, graph generator 36 averages the moving object activity values of the respective detection unit periods to obtain a moving object activity value for an aggregation unit period based on the average. Thereafter, graph generator 36 creates a graph (transition information) indicating a transition of moving activity values for the aggregation unit periods.

When the detection unit period and the aggregation unit period are the same, the process for averaging is not required. In the example illustrated in FIG. 9, the aggregation unit period is set to one hour. Suppose that activity value obtainer 34 obtains moving object activity values while setting the detection unit period to one hour, i.e., executes counting with the person frame for one hour. In this case, the detection unit period and the aggregation unit period are equivalent to each other, so that the process for averaging is not required. On the other hand, the process for averaging is required when the detection unit period and the aggregation unit period are different. For example, when the aggregation unit period and the detection unit period are one day and one hour, respectively, in graphing a transition of moving object activity values for one week, an average for one day is calculated from moving object activity values for every one hour to obtain a moving object activity value for every one day.

Figure 12:
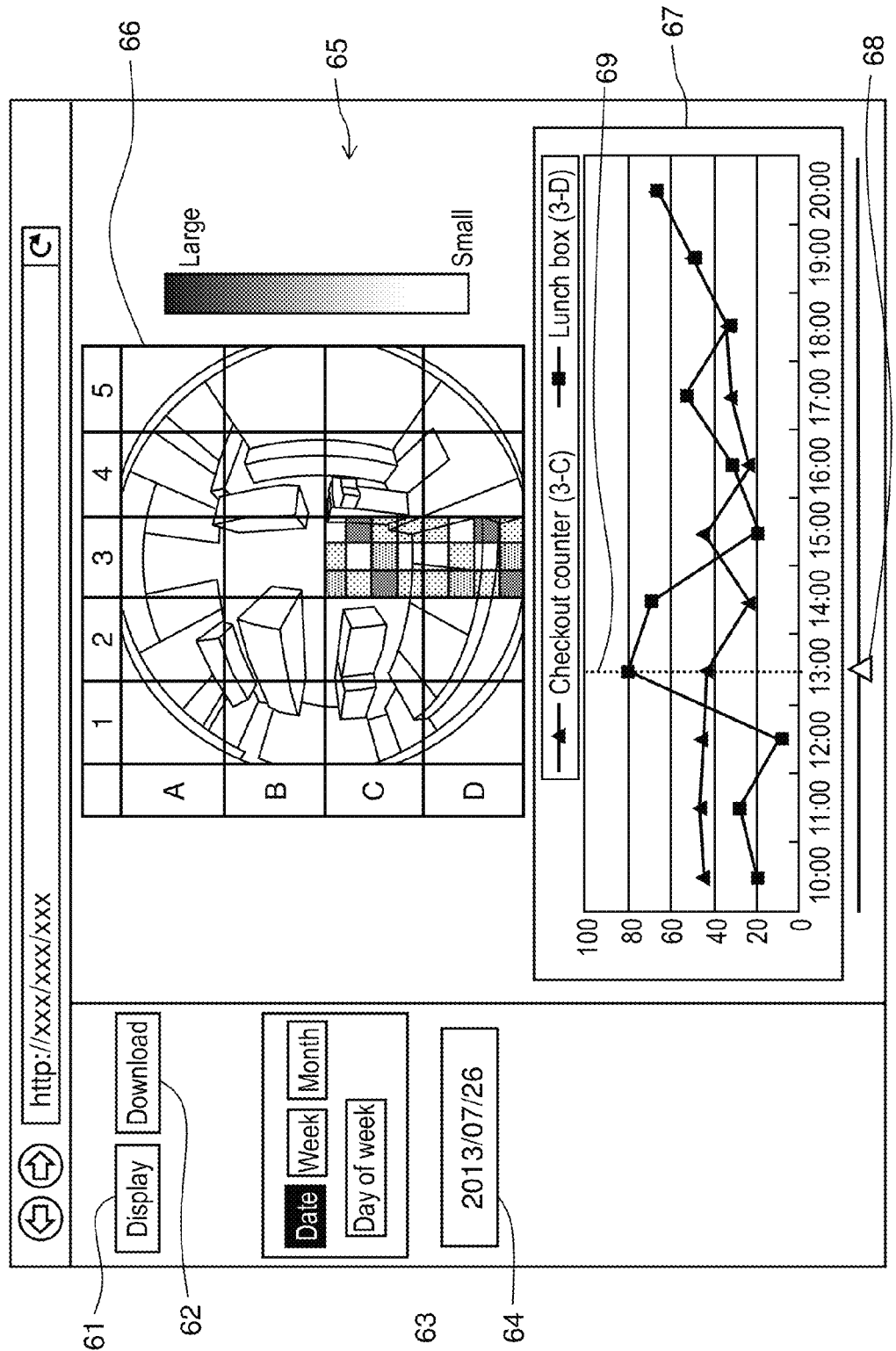
FIG. 12 is a diagram illustrating an analysis result output screen displayed on monitor 4.
Figure 13:
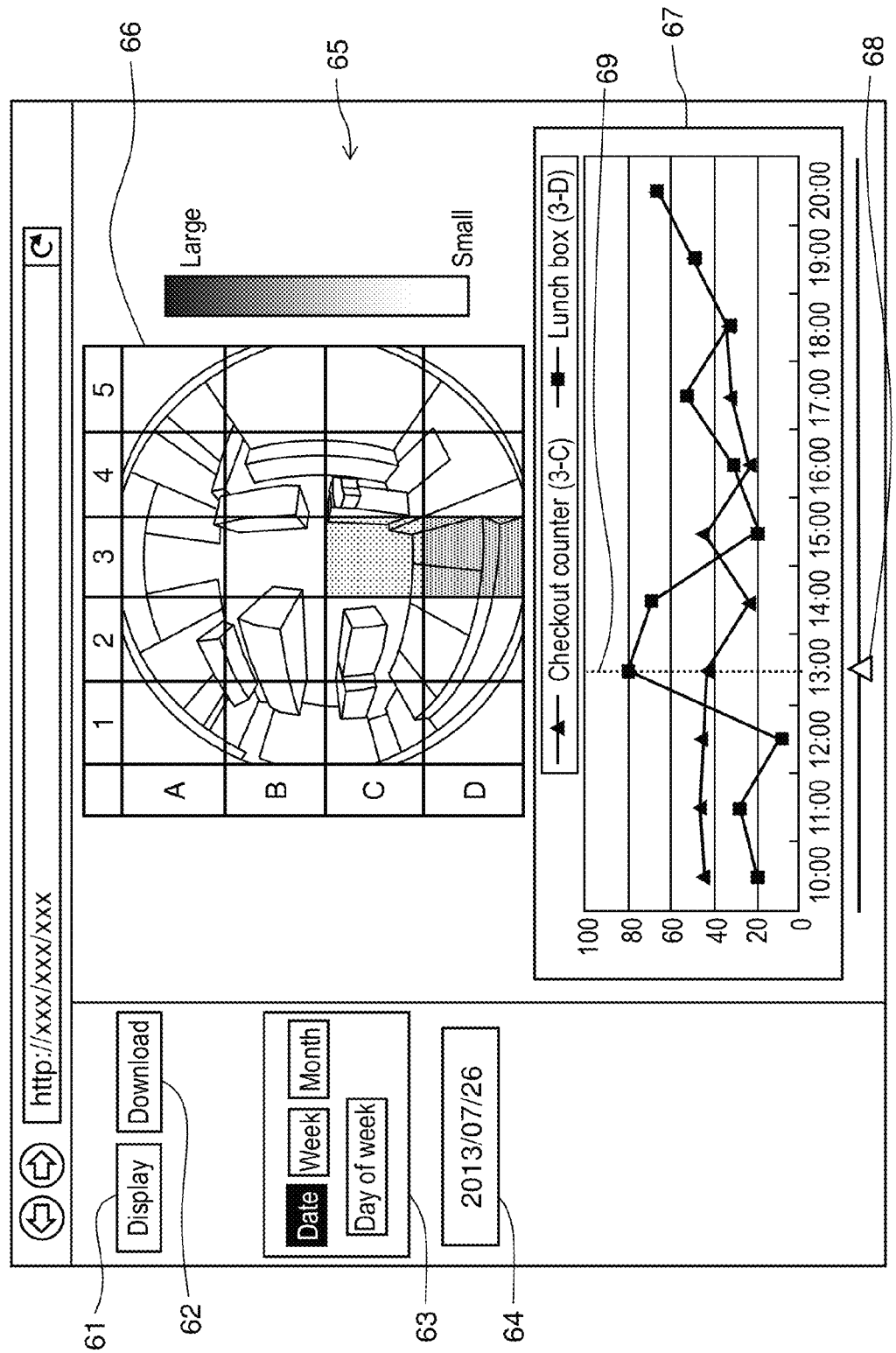
FIG. 13 is a diagram illustrating an analysis result output screen displayed on monitor 4.
Figure 14:
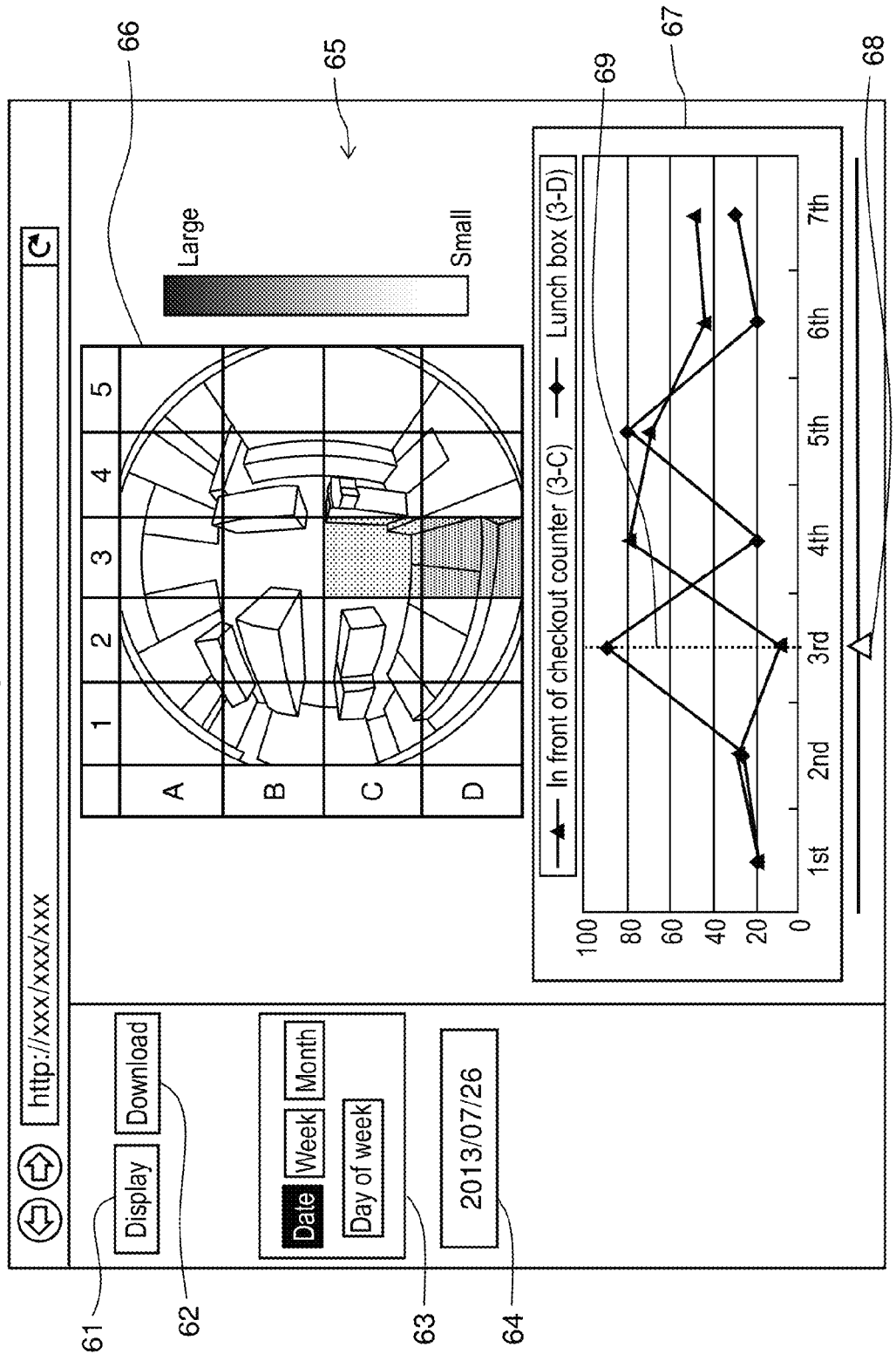
FIG. 14 is a diagram illustrating an analysis result output screen displayed on monitor 4.
Figure 15:
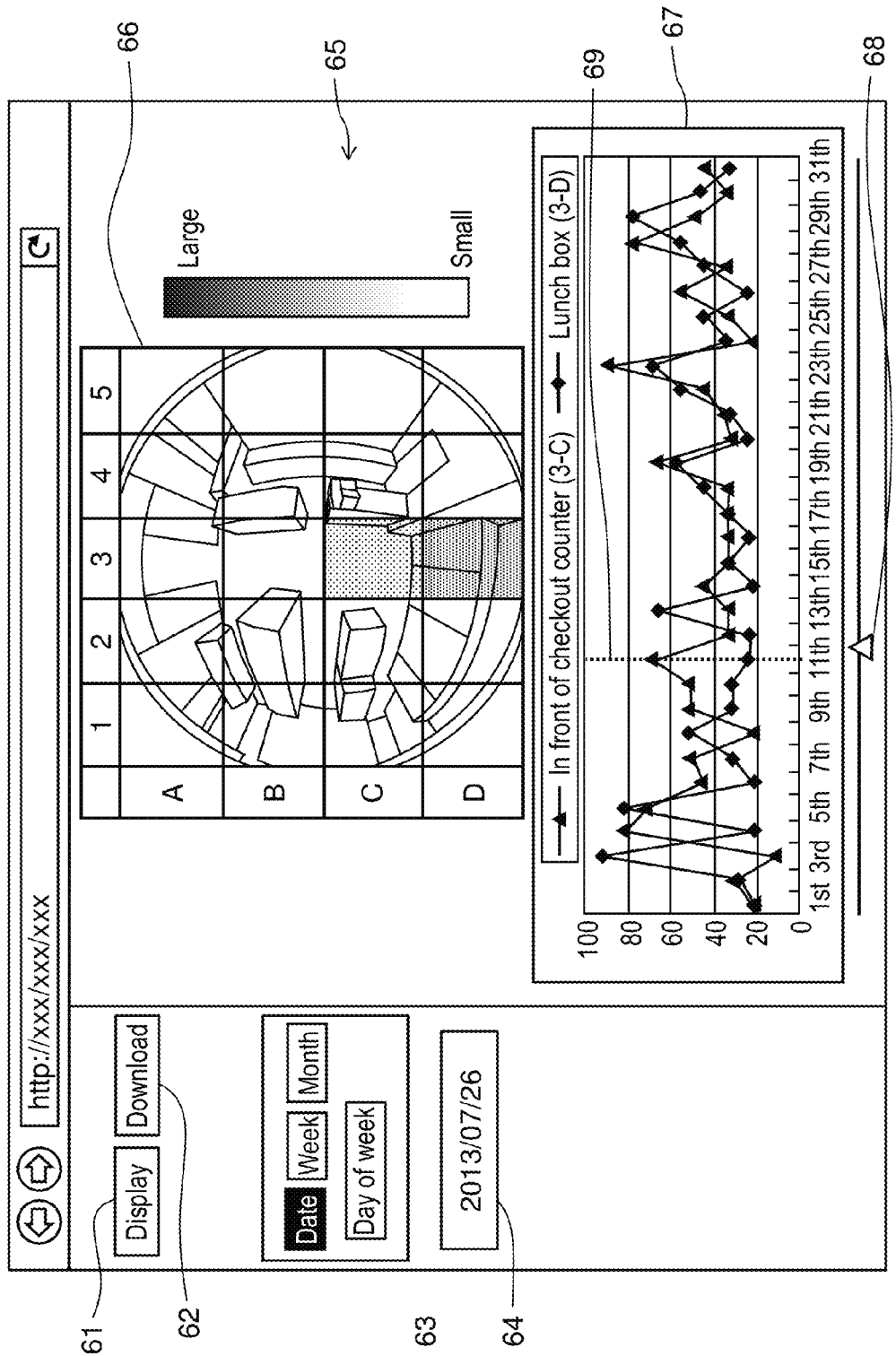
FIG. 15 is a diagram illustrating an analysis result output screen displayed on monitor 4.
Figure 16:
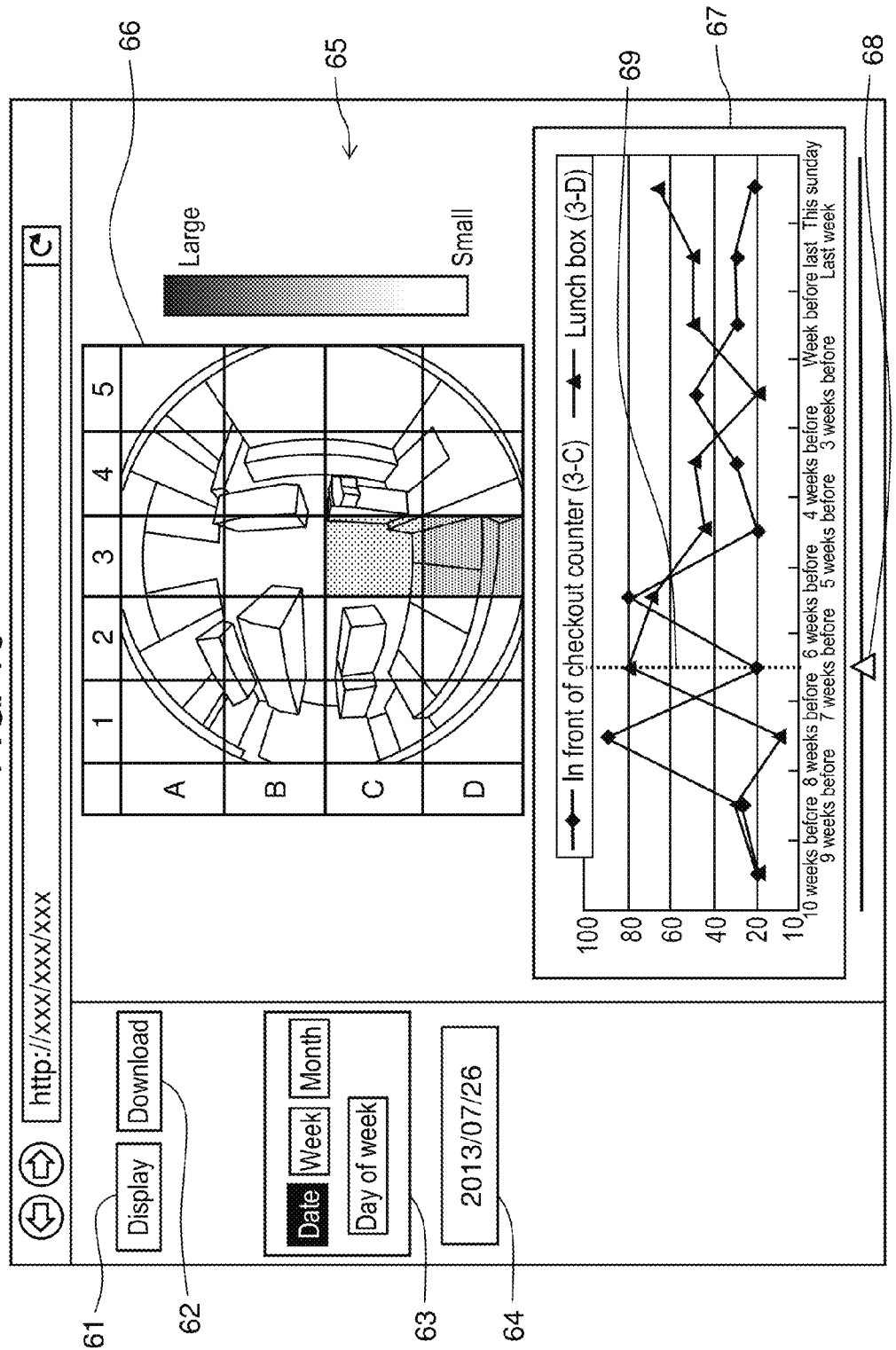
FIG. 16 is a diagram illustrating an analysis result output screen displayed on monitor 4.

An analysis result output screen displayed on monitor 4 illustrated in FIG. 3 is now described. FIGS. 10 through 16 are diagrams illustrating the analysis result output screen displayed on monitor 4. FIGS. 10 through 13 illustrate examples of different activity maps, and FIGS. 14 through 16 illustrate examples of different graphs.

Each of the analysis result output screens illustrated in FIGS. 10 through 16 is an output of analysis results obtained by activity map creating unit 32, and includes display button 61, download button 62, aggregation mode selection portion 63, date display portion 64, and analysis result output portion 65. Analysis result output unit 65 includes map display portion 66, graph display portion 67, and slider (operation unit) 68.

Display button 61 is a button for displaying analysis results on analysis result output portion 65. Download button 62 is a button for obtaining data on analysis results. According to this exemplary embodiment, in particular, an analysis result output document created by document generator 39 of PC 3 is obtained by operating download button 62. With this configuration, the analysis result output document is displayed on monitor 12 of a device different from PC 3 executing the activity map creating process, such as PC 11 provided in the head office, or printed out from a printer for inspection. The analysis result output document will be described later.

Aggregation mode selection portion 63 selects an aggregation mode for a graph displayed on graph display portion 67. According to this exemplary embodiment, in particular, aggregation modes to be set are date, week, month, and day of week. When any one of the aggregation modes of date, week, and month is selected, a corresponding graph showing a transition of moving object activity values for one day, one week, or one month is displayed. When the aggregation mode of day of week is selected, a graph showing a transition of moving object activity values on the same day of each week is displayed. After any one of the aggregation modes is selected on aggregation mode selection portion 63, a calendar screen (not shown) is displayed in pop-up display so that display of analysis results for a desired date, week, or month can be selected on the calendar screen.

Date display portion 64 displays the date of analysis results displayed on analysis result output portion 65. A date may be directly input to date display portion 64 to designate display of analysis results for a desired date displayed on analysis result output portion 65.

Map display portion 66 displays an activity map created by map generator 35 and overlapped on a captured image of the monitoring area. Graph display portion 67 displays a graph created by graph generator 36. Map display portion 66 and graph display portion 67 will be described later.

Slider 68 adjusts the date and time of the activity map and the captured image displayed on map display portion 66. The activity map and the captured image are switched to an activity map and a captured image at a desired date and time by operating slider 68. Specifically, slider 68 is configured to slide in a direction along the horizontal axis (time axis) of a graph displayed on graph display portion 67. When slider 68 is shifted using input device 6 such as a mouse, line 69 displayed on graph display portion 67 moves accordingly. Then, an activity map and a captured image corresponding to the date and time indicated by line 69 is displayed on map display portion 66.

Map display portion 66 of the analysis result output screen illustrated in FIGS. 10 through 16 is now described. Map display portion 66 displays an activity map which visualizes the degree of activity of a person with the activity map overlapped on a captured image of the monitoring area. This activity map includes portions colored in display colors corresponding to the levels of moving object activity values based on the color table illustrated in FIG. 8. In this case, only the grids set as the target areas are displayed in the display colors corresponding to the moving object activity values, while the grids not set as the target area are colorless blanks.

Figure 10:
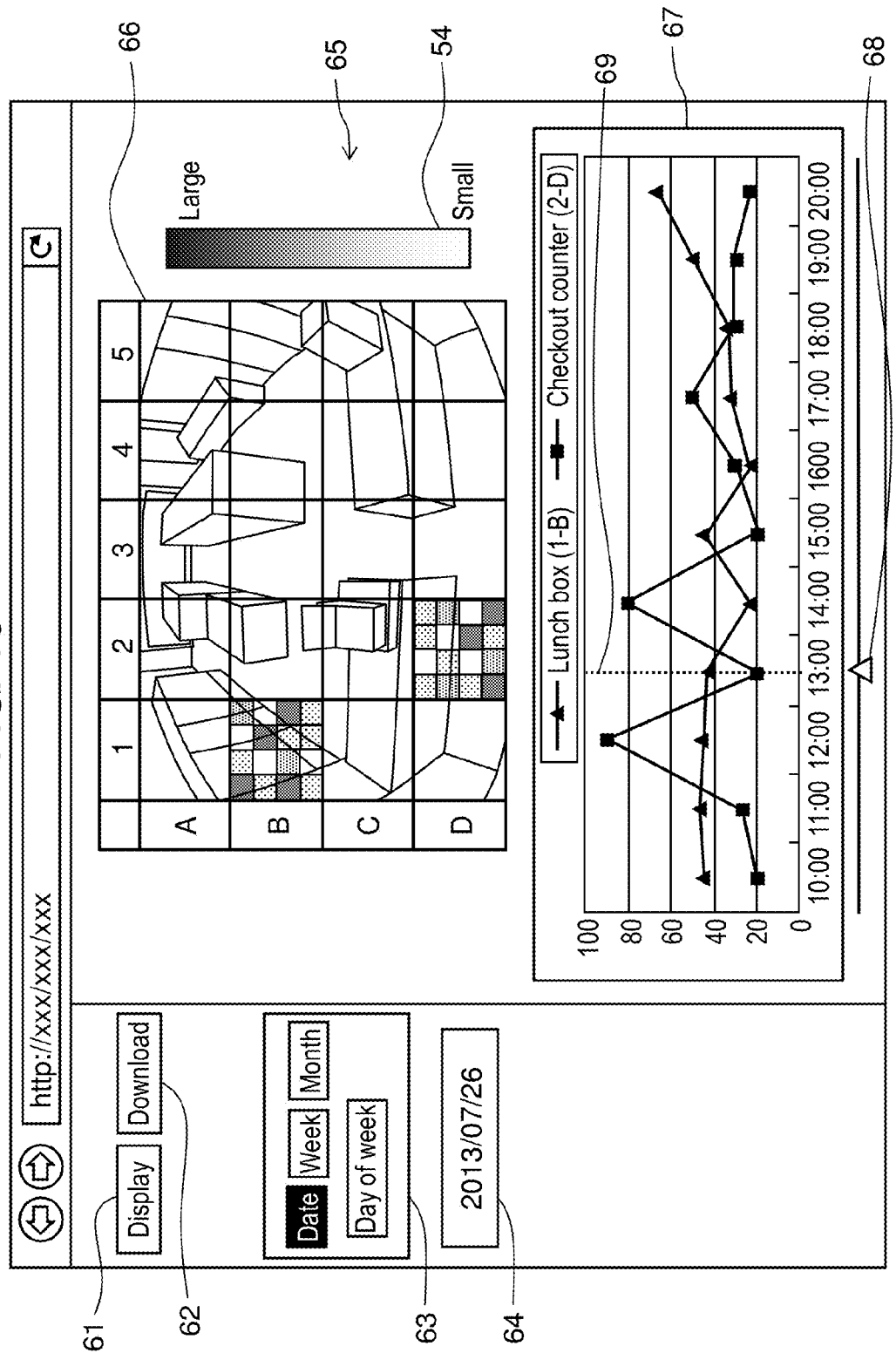
FIG. 10 is a diagram illustrating an analysis result output screen displayed on monitor 4.
Figure 11:
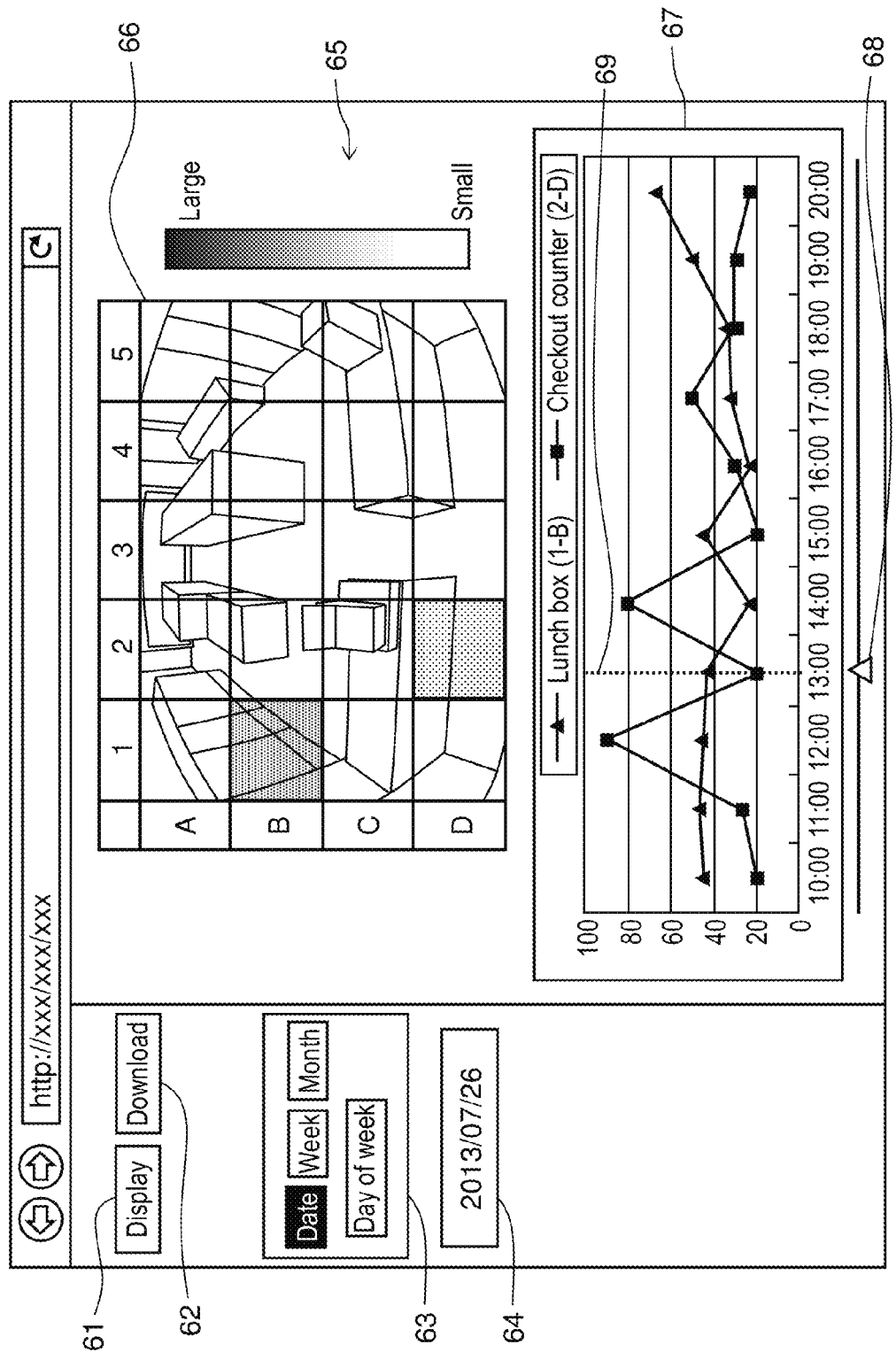
FIG. 11 is a diagram illustrating an analysis result output screen displayed on monitor 4.

The examples illustrated in FIGS. 10 and 11 are examples in which a box camera is used. A rectangular image captured by the box camera is displayed on map display portion 66. The examples illustrated in FIGS. 12 and 13 are examples in which an omni-directional camera is used. A circular image captured by the omni-directional camera is displayed on map display portion 66.

According to this exemplary embodiment, units for display (pixels or grids) are selected on the analysis condition input screen illustrated in FIGS. 5 and 6. In this case, an activity map in units of pixel of the captured image, or an activity map in units of grid of the captured image is displayed on map display portion 66 in accordance with the selection operation. The examples illustrated in FIGS. 10 and 12 are examples when pixels are selected as units for display (each pixel is shown in a larger size for convenience of explanation), and an activity map having units of pixels is displayed on map display portion 66. The examples illustrated in FIGS. 11 and 13 are examples when grids are selected as units for display, and an activity map in units of grids is displayed on map display portion 66.

Graph display portion 67 of the analysis result output screen illustrated in FIGS. 10 through 16 is now described. Graph display portion 67 displays a graph (line graph) showing a transition of the moving object activity value with time for each grid set as the target area. According to this exemplary embodiment, in particular, the aggregation mode for the graph to be displayed on graph display portion 67 can be selected on aggregation mode selection portion 63. The horizontal axis of the graph varies in accordance with the selected aggregation mode. The vertical axis of the graph represents the moving object activity value (counter value) for each grid.

The examples illustrated in FIGS. 10 through 13 are examples when the aggregation mode of "date" is selected. In this case, a graph (line graph) showing a transition of moving object activity values for a designated date is displayed on graph display portion 67 in responding to designation of a particular date by the user. Specifically, the horizontal axis of the graph represents time zones, and such a graph is displayed which divides business hours for a day into time zones (1 hour) and connects moving object activity values for the respective time zones in time series. This graph allows comparison of changes of moving object activity values between the respective time zones on the particular date for each of grids set as the target areas.

The example illustrated in FIG. 14 is an example when the aggregation mode "week" is selected. In this case, a graph (line graph) showing a transition of moving object activity values in a designated week is displayed on graph display portion 67 in response to designation of a particular week by the user. Specifically, the horizontal axis of the graph represents dates (days of week), and such a graph is displayed which divides one week into dates and connects moving object activity values for the respective dates in time series. This graph allows comparison of changes of moving object activity values between the respective dates of the particular week for each of grids set as the target areas.

The example illustrated in FIG. 15 is an example when the aggregation mode "month" is selected. In this case, a graph (line graph) showing a transition of moving object activity values in a designated month is displayed on graph display portion 67 in response to designation of a particular month by the user. Specifically, the horizontal axis of the graph represents dates, and such a graph is displayed which divides one month into dates and connects moving object activity values for the respective dates in time series. This graph allows comparison of changes of moving object activity values between the respective dates of the particular month for each of grids set as the target areas.

The example illustrated in FIG. 16 is an example when the aggregation mode "day of week" is selected. In this case, a graph (line graph) showing a transition of moving object activity values in a designated day of each week is displayed on graph display portion 67 in response to designation of a particular day of week by the user. Specifically, the horizontal axis of the graph represents the same day of each week, and such a graph is displayed which connects moving object activity values for the designated day of respective weeks in time series. This graph allows comparison of changes of moving object activity values between the particular days of week for each of grids set as the target areas. According to this example, in particular, moving object activity values are displayed in the range from the designated day of the current week to the designated day of a previous week for each. Accordingly, previous changes of moving object activity values on the particular day of week are recognizable.

The graph displayed on graph display portion 67 is shown for each grid set as the target area. However, the activity map displayed on map display portion 66 may be shown either in pixels or in grids in accordance with selection of units for display.

Accordingly, the system in this exemplary embodiment detects a person from a captured image of a monitoring area, and obtains a moving object activity value for each of predetermined detection elements (pixels) plurally divided from the captured image based on the detection results. Subsequently, the system aggregates the moving object activity values of the respective detection elements for each target area set in the monitoring area in accordance with input operation by the user to obtain a moving object activity value of the target area. Then, the system creates an activity map for the target areas based on the moving object activity values of the target areas. Accordingly, the system in this exemplary embodiment allows rapid recognition of an activity situation of a person staying in an area noted by the user within the monitoring area.

The system according to this exemplary embodiment obtains a person frame indicating an area where the person detected from the captured image in the monitoring area is present, and counts the number of times of presence of each detection element (pixel) within the person frame to obtain a moving object activity value for each detection element. Accordingly, the system provides a moving object activity value for each detection element by simplified processing.

The system according to this exemplary embodiment displays a graph (transition information) indicating a transition of the moving object activity value for the target area. Accordingly, the system allows rapid recognition of changes of the activity situation of the person with an elapse of time. Moreover, display of an activity map allows rapid recognition of the activity situation of the person within the monitoring area in a particular period. Furthermore, consideration of both an activity map and a graph allows recognition of the activity situation of the person within the monitoring area from diversified viewpoints.

The system according to this exemplary embodiment sets the target areas in units of grid corresponding to each of a plurality of grids divided into square block shapes from the captured image in accordance with input operation by the user. Accordingly, the system allows easy designation of the target areas.

The system according to this exemplary embodiment creates an activity map which visualizes the degree of activity of the person in units of grid set as target areas. Accordingly, this system allows rapid recognition of the activity situation of the person staying in an area particularly noted by the user within the monitoring area.

The system according to this exemplary embodiment creates an activity map which visualizes the degree of activity of the person in units of pixel of the captured image. Accordingly, this system allows detailed recognition of the activity situation of the person within the monitoring area.

The system according to this exemplary embodiment averages moving object activity values of respective detection unit periods for each aggregation unit period to obtain a moving object activity value for each aggregation unit period, and creates transition information on a transition of the moving object activity values of respective aggregation unit periods. Accordingly, the system easily obtains a moving object activity value for each of arbitrary aggregation unit periods (such as date, week, and month) based on moving object activity values for every given detection unit periods (e.g., one hour). In this case, the system provides a variety of transition information by varying the aggregation unit periods. Accordingly, the system allows recognition of changes of the degree of activity of the person from multiple viewpoints.

The system according to this exemplary embodiment provides slider (operation unit) 68 in the analysis result output screen for adjusting the date and time of the activity map displayed in map display portion 66 in accordance with operation by the user. In this case, the date and time of a map image displayed on map display portion 66 is adjustable, facilitating viewing of an activity map and a captured image for a desired date and time. Moreover, the activity map and the captured image switch to other map and image with date and time by successive operation of slider 68. Accordingly, the system allows rapid recognition of changes of the activity situation of the person and the actual condition of the monitoring area.

According to this exemplary embodiment, in particular, slider 68 is configured to shift in a direction along the horizontal axis (time axis) of the graph displayed in graph display portion 67. In this case, indicator (line) 69 indicating the date and time on the graph shifts in accordance with shift operation of slider 68. Accordingly, the system allows easy checking of the activity situation of the person and the actual condition of the monitoring area for the noted date and time on the graph displayed on graph display portion 67 based on the activity map and the captured image in map display portion 66.

The system according to this exemplary embodiment displays the activity map overlapped on the captured image of the monitoring area. Accordingly, the system allows checking of the activity situation of the person in comparison with the actual condition of the monitoring area shown in the captured image. Moreover, this configuration displays the transition of the moving object activity values on the graph. Accordingly, this configuration further facilitates recognition of changes of the moving object activity values with time. Furthermore, the activity map and the graph are arranged side by side. Accordingly, the system facilitates comparison between the activity map and the graph, thereby allowing easy recognition of the activity situation of the person within the monitoring area from diversified viewpoints.

Figure 17:
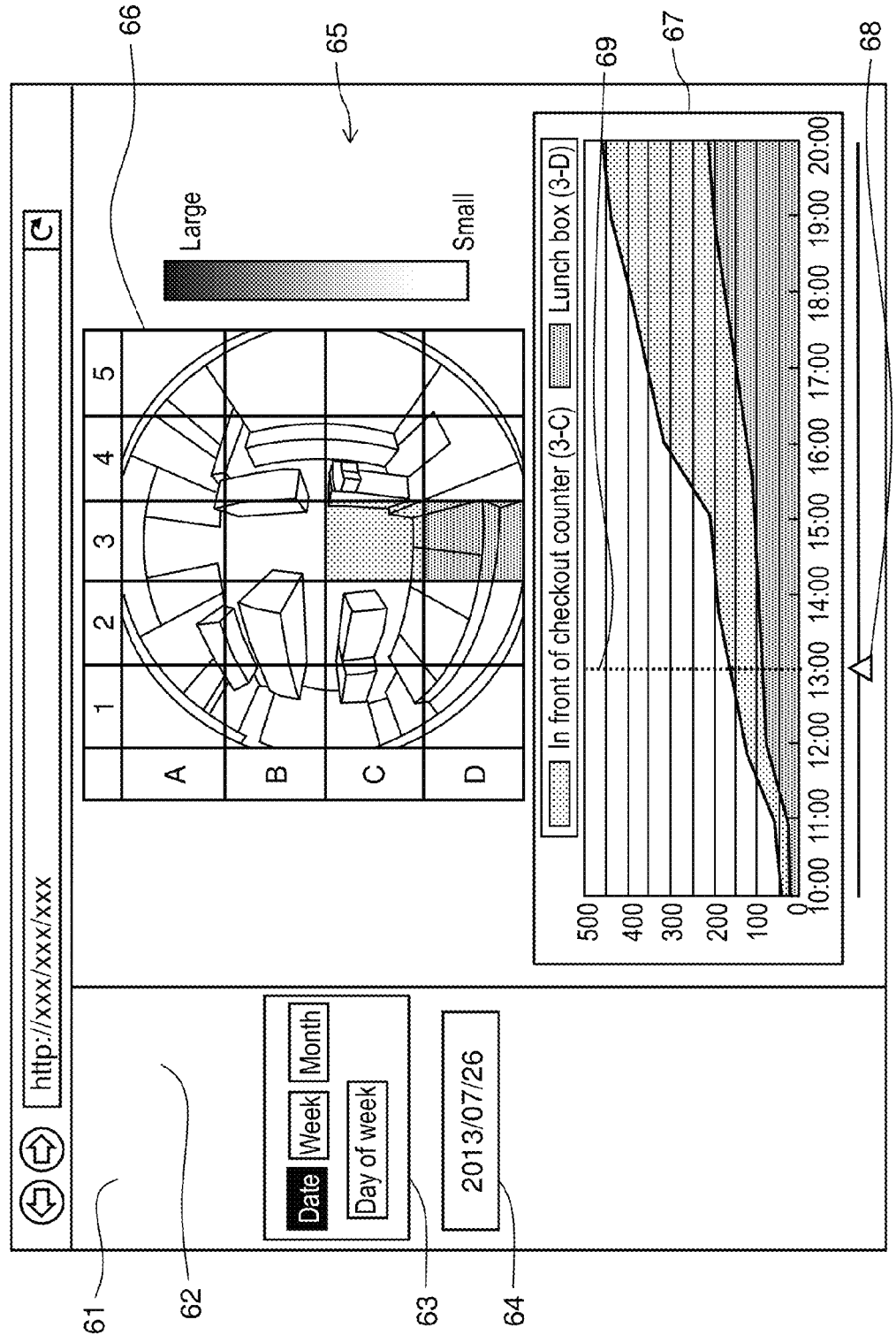
FIG. 17 is a diagram illustrating an analysis result output screen displayed on monitor 4 in another example.

Another example of the graph displayed in graph display portion 67 of the analysis result output screen shown on monitor 4 is described. FIG. 17 is a diagram illustrating a graph displayed in graph display portion 67 according to another example.

According to this exemplary embodiment, graph generator 36 executes a process for creating graphs (transition information) each showing a transition of the moving object activity value for the corresponding grid set as a target area while accumulating the moving object activity values for the respective grids. This process produces an area chart displayed in graph display portion 67 of the analysis result output screen as illustrated in FIG. 17.

The area chart shows graphs (line graphs) each connecting moving object activity values in time series for the corresponding grid set as a target area, while accumulating the graphs for the respective grids on the chart. The example shown in FIG. 17 is an example in which the aggregation mode of "date" is selected similarly to the examples shown in FIGS. 10 through 13. The horizontal axis represents time zones, and each of the line graphs displayed is produced by connecting moving object activity values for the respective time zones on the designated date in time series.

While the area chart constituted by linear graphs is shown in FIG. 17, a stacked bar chart may be displayed instead of the area chart.

The system according to this exemplary embodiment displays an area chart showing transitions of moving object activity values for the respective grids designated as the target areas while accumulating the moving object activity values for the respective grids on the chart. Accordingly, the system allows rapid recognition of changes of an activity situation of a person with an elapse of time in a plurality of target areas in an integrated manner.

According to this exemplary embodiment, PC 3 has a function as a Web server, and allows display of the analysis condition input screen illustrated in FIGS. 5 and 6, and the analysis result output screen illustrated in FIGS. 10 through 17 using a Web browser. In this case, the functions of analysis condition input and analysis result output may be realized by a device different from PC 3 executing the activity map creating process, such as a general-purpose Web browser introduced into PC 11 provided in the head office.

The analysis result output document created by document generator 39 illustrated in FIG. 3 is described. FIGS. 18 through 21 are diagrams illustrating the analysis result output document created by document generator 39.

According to this exemplary embodiment, document generator 39 illustrated in FIG. 3 executes a process for creating an analysis result output document. In this case, inspection of the analysis result output document thus created is allowed by PC 3 which executes the activity map analysis process. According to this exemplary embodiment, in particular, a device different from the device executing the activity map creating process, such as PC 11 in the head office, may obtain the analysis result output document and allow inspection of the analysis result output document using a monitor or a printer in accordance with operation of download button 62 provided in the analysis result output screens illustrated in FIGS. 10 through 17 at the time of inspection of the analysis result output screen.

As illustrated in FIGS. 18 through 21, the analysis result output document includes graph display portion 71 and map display portion 72. Graph display portion 71 displays a graph created by graph generator 36. Map display portion 72 displays an activity map created by map generator 35 and overlapped on a captured image of the monitoring area.

Figure 18:
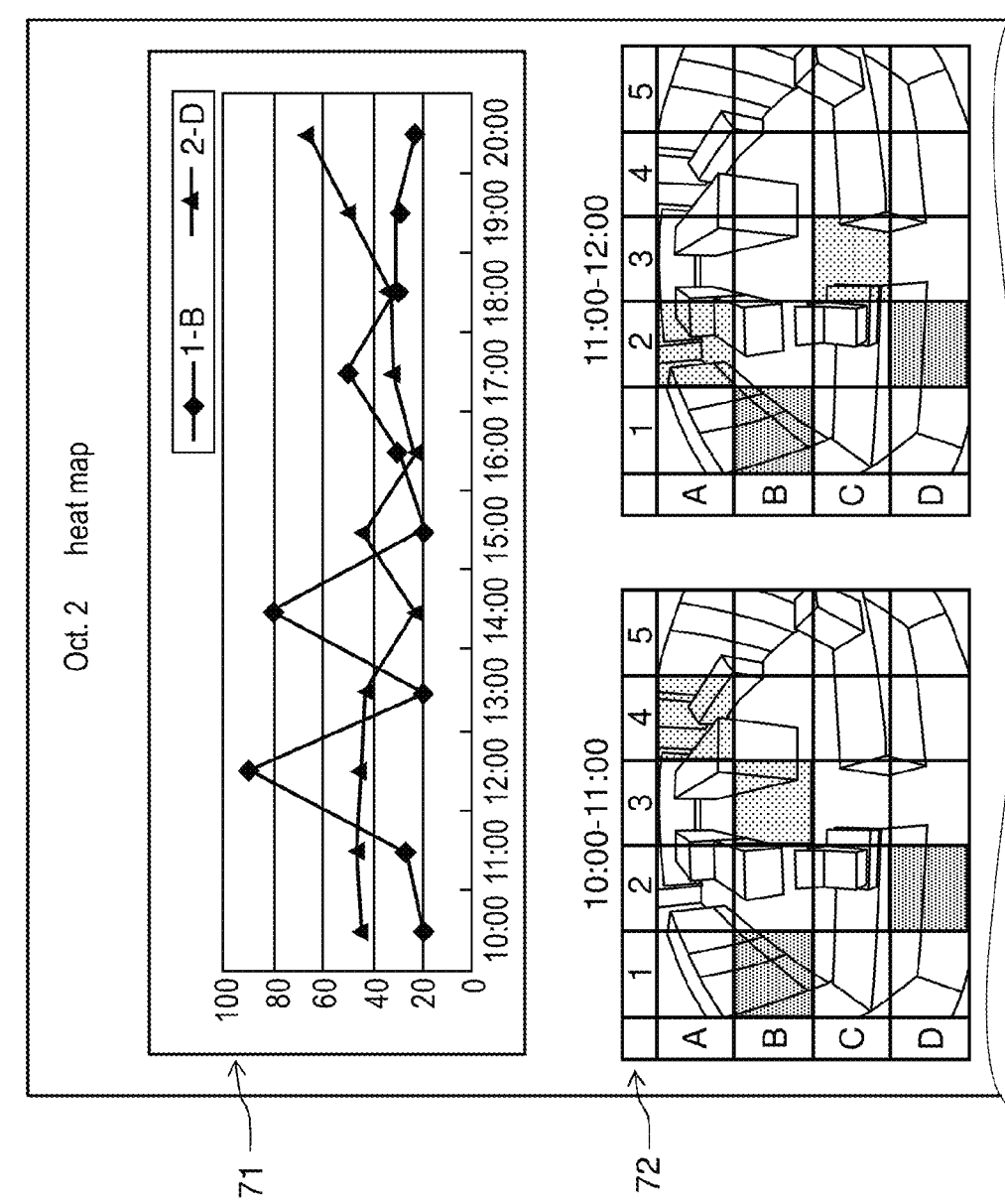
FIG. 18 is a diagram illustrating an analysis result output document created by document generator 39.

The example illustrated in FIG. 18, in particular, is an example in which the aggregation mode of "date" is selected similarly to the analysis result output screens illustrated in FIGS. 10 through 13. Accordingly, graph display portion 71 displays a graph (line graph) which connects activity values for respective time zones in time series for each grid designated as a target area. Map display portion 72 displays activity maps for the respective time zones. While only the activity maps for the initial two time zones are shown in FIG. 18, activity maps for other time zones are similarly displayed subsequently to the activity maps for the initial two time zones by using a horizontal scroll button (not shown).

Figure 19:
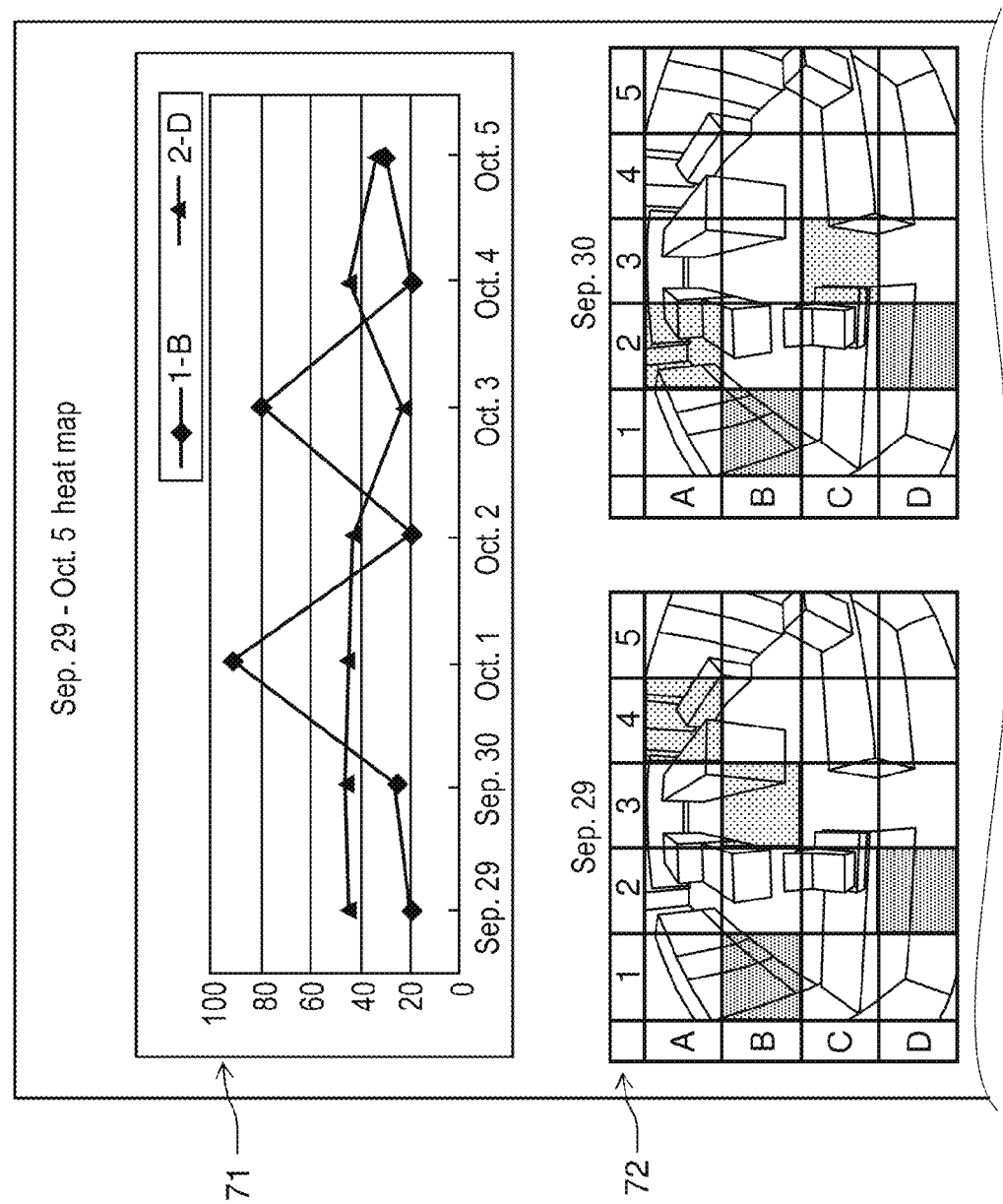
FIG. 19 is a diagram illustrating an analysis result output document created by document generator 39.

The example illustrated in FIG. 19 is an example in which the aggregation mode of "week" is selected similarly to the analysis result output screen illustrated in FIG. 14. Accordingly, graph display portion 71 displays a graph (line graph) which connects moving object activity values for respective dates (days of week) in time series for each grid designated as a target area. Map display portion 72 displays activity maps for the respective dates. While only the activity maps for the initial two days of week are shown in FIG. 19, activity maps for other days of week are similarly displayed subsequently to the activity maps for the initial two days of week by using the horizontal scroll button (not shown).

Figure 20:
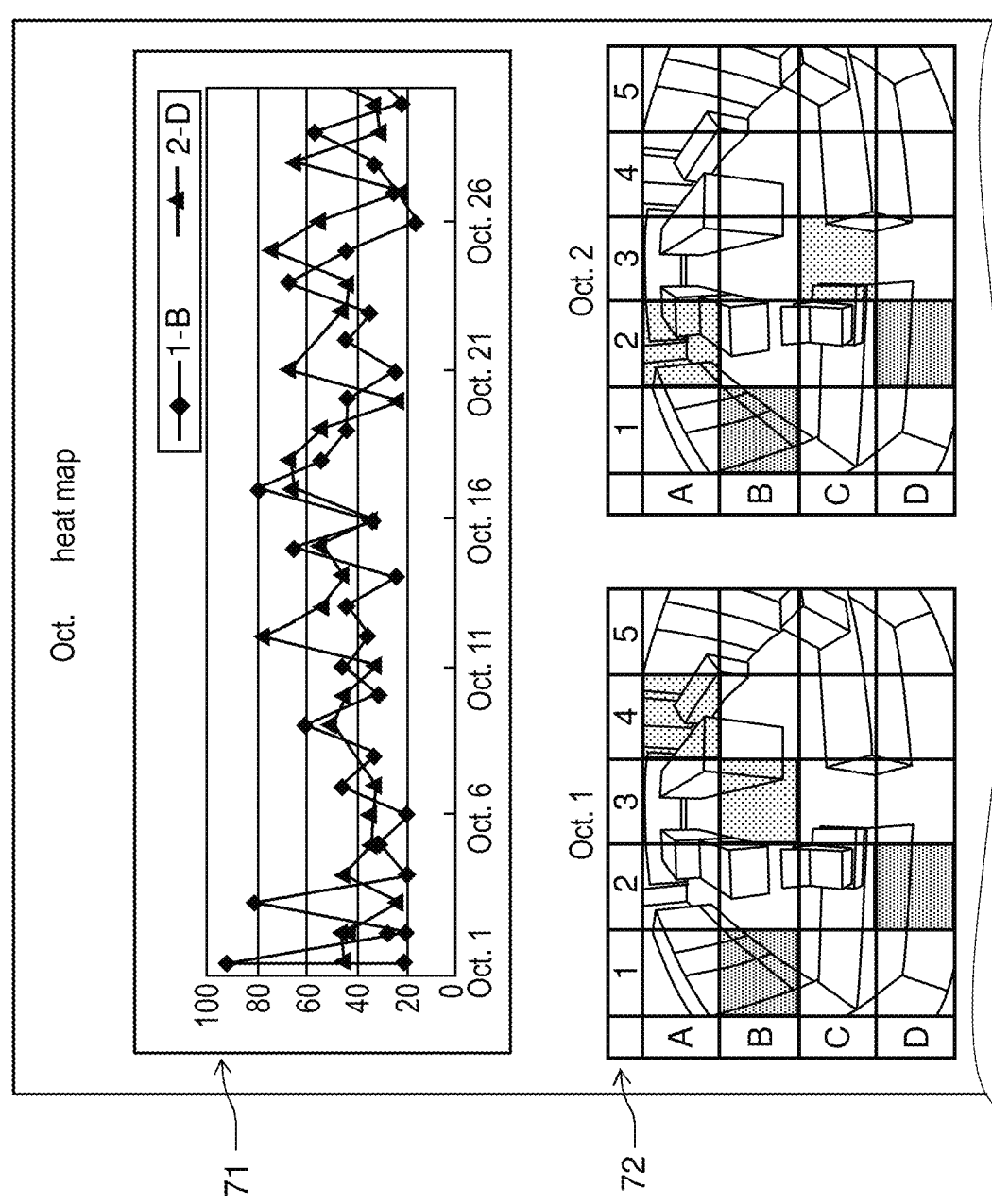
FIG. 20 is a diagram illustrating an analysis result output document created by document generator 39.

The example illustrated in FIG. 20 is an example in which the aggregation mode of "month" is selected similarly to the analysis result output screen illustrated in FIG. 15. Accordingly, graph display portion 71 displays a graph (line graph) which connects moving object activity values for respective dates in time series for each grid designated as a target area. Map display portion 72 displays activity maps for the respective dates. While only the activity maps for the initial two dates are shown in FIG. 20, activity maps for other dates are similarly displayed subsequently to the activity maps for the initial two dates.

Figure 21:
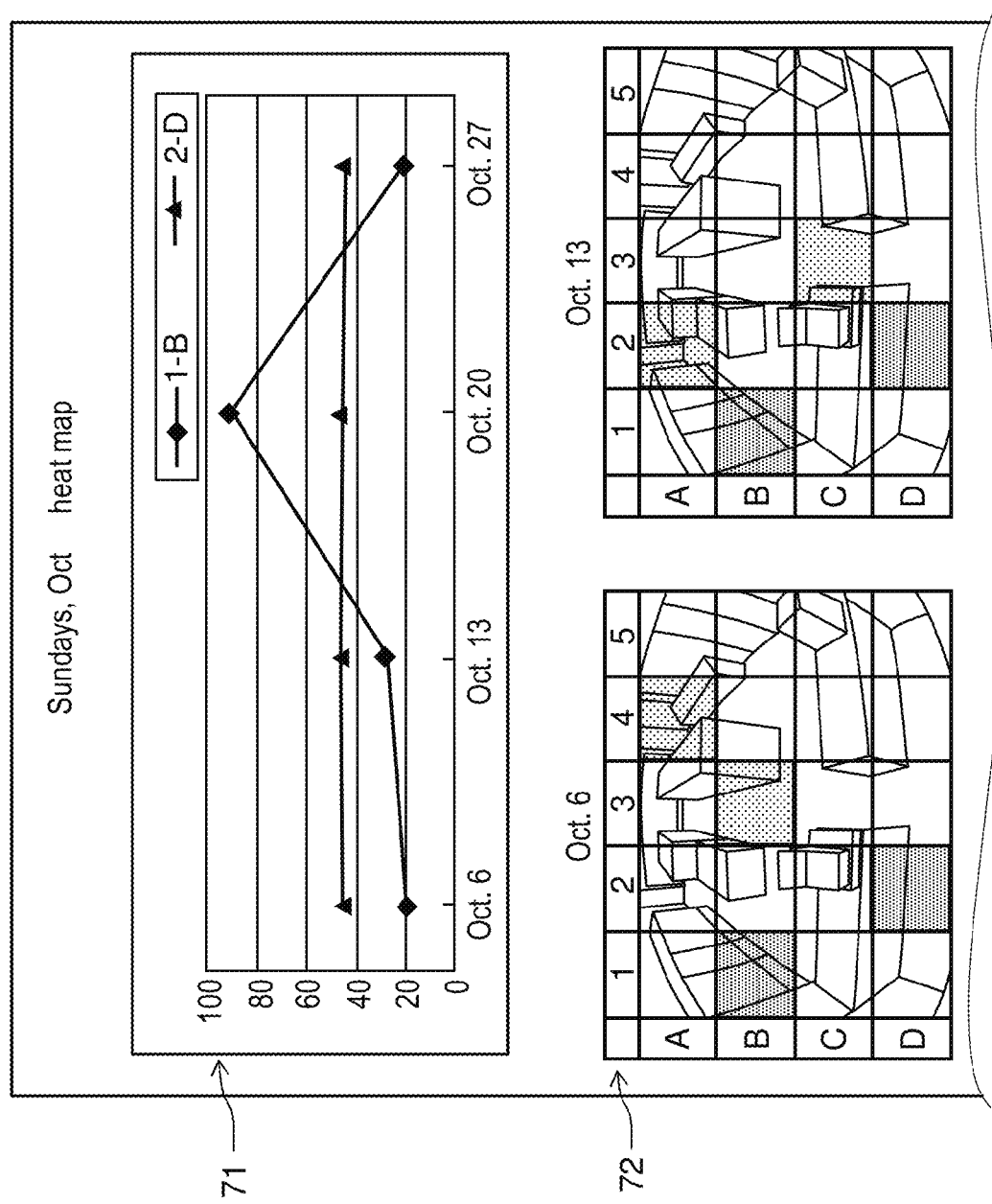
FIG. 21 is a diagram illustrating an analysis result output document created by document generator 39.

The example illustrated in FIG. 21 is an example in which the aggregation mode of "day of week" is selected similarly to the analysis result output screen illustrated in FIG. 16. Accordingly, graph display portion 71 displays a graph (line graph) which connects moving object activity values for the same day of respective weeks in time series for each grid designated as a target area. In the example illustrated in FIG. 21, in particular, a graph for a designated day of week in a designated month is displayed based on designated month and day of week unlike the analysis result output screen illustrated in FIG. 16. Map display portion 72 displays activity maps for the respective dates. While only the activity maps for the initial two dates are shown in FIG. 21, activity maps for other dates are similarly displayed subsequently to the activity maps for the initial two dates by using the horizontal scroll button (not shown).

(Second Exemplary Embodiment)

Figure 22:
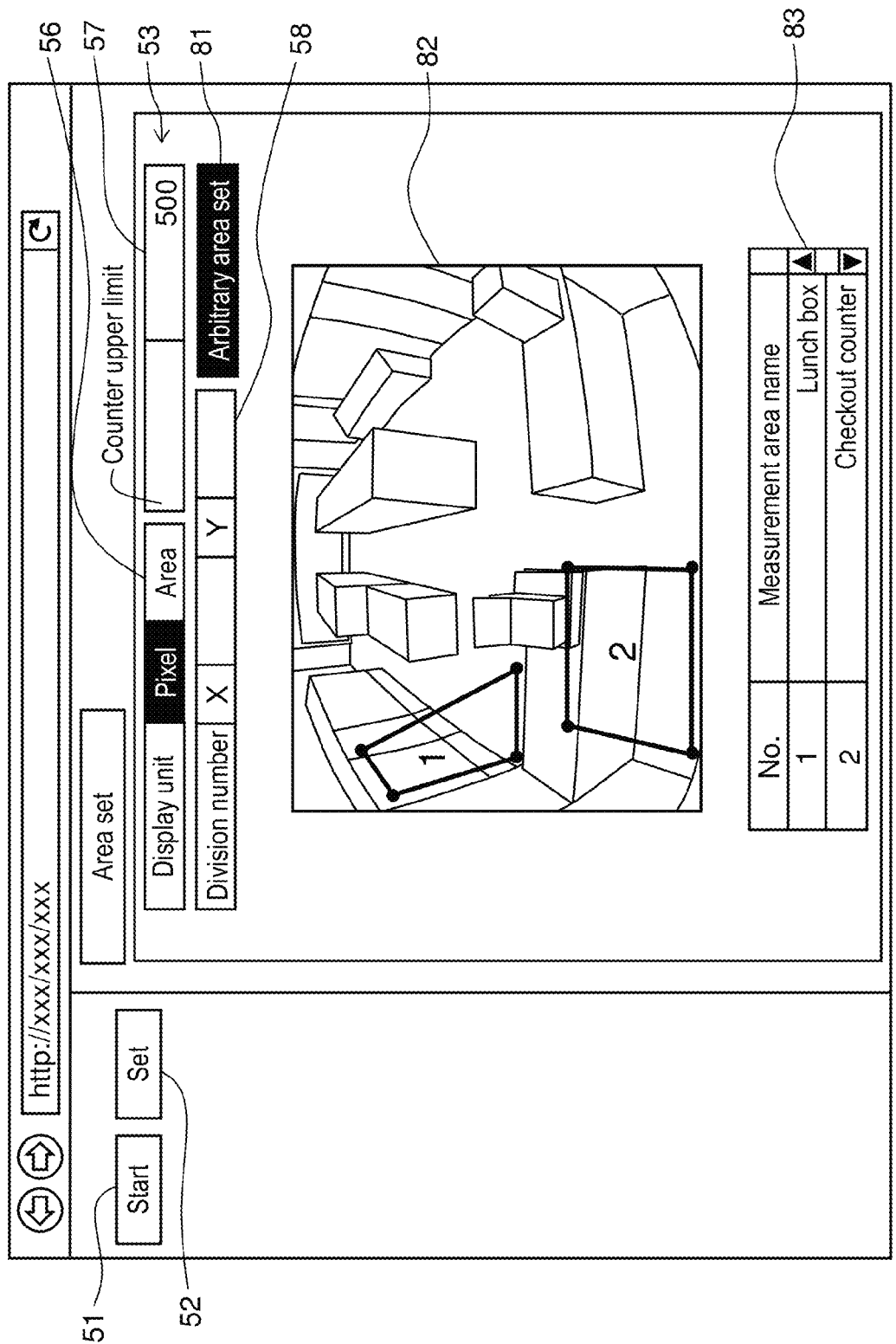
FIG. 22 is a diagram illustrating an analysis condition input screen of an activity map creating system according to a second exemplary embodiment.

An activity map analysis system according to a second exemplary embodiment is hereinafter described. FIG. 22 is a diagram illustrating an analysis condition input screen of the activity map analysis system according to the second exemplary embodiment. The points similar to the corresponding points in the first exemplary embodiment are not repeated.

According to the first exemplary embodiment, the user designates target areas in units of grid corresponding to each of the plurality of grids in the shape of square blocks divided from a captured image. According to the second exemplary embodiment, however, the user may designate target areas in arbitrary shapes. In this case, analysis condition setter 37 executes a process for setting target areas in arbitrary shapes designated by the user in accordance with input operation by the user.

According to the second exemplary embodiment, analysis condition input portion 53 of the analysis condition input screen has arbitrary area setting mode selection portion 81 as illustrated in FIG. 22. The analysis condition input screen further has target area input portion 82, and target area registration portion 83. Other parts are similar to the corresponding parts in the examples illustrated in FIGS. 5 and 6.

Arbitrary area setting mode selection portion 81 selects an arbitrary area setting mode for setting target areas in arbitrary shapes. Needless to say, it is not allowed to input the division number of grids to grid division number input portion 58 after selection of the arbitrary area setting mode.

Target area input portion 82 displays an image captured by camera 1 and urges the user to input desired target areas to the captured image. When a desired target area has a polygonal shape, for example, vertexes of a measurement area are input using input device 6 such as a mouse. When a desired target area has a round shape, a center and a radius are input. Alternatively, a line representing the outer circumference of a target area may be drawn using a mouse to set the target area by the track of the mouse. After completion of input of the target area, a serial number for the target area is displayed on the image representing the corresponding measurement area.

Target area registration portion 83 includes a serial number display column and a name input column. The serial number display column displays serial numbers (Nos.) for the corresponding measurement areas. The name input column receives the names of the respective target areas input from the user by using input device 6 such as a keyboard.

After the target areas are set in this manner, processes similar to the corresponding processes in the first exemplary embodiment are executed by activity value obtainer 34, map generator 35, and graph generator 36 based on the target areas. Then, an analysis result output screen similar to the analysis result output screens illustrated in FIGS. 10 through 17 is displayed on the monitor. In addition, an analysis result output document similar to the analysis result output documents illustrated in FIGS. 18 through 21 is created.

As discussed above, the system in the second exemplary embodiment sets target areas in arbitrary shapes designated by the user in accordance with input operation by the user. Accordingly, the system allows setting of the target areas in optimum shapes in accordance with the actual conditions of the monitoring area.

The respective specific exemplary embodiments according to the present disclosure are presented by way of example only, and are not intended to limit the present disclosure in any way. In the present disclosure, all the respective constituent elements of the activity map creating device, activity map creating system, and activity map creating method described in the foregoing embodiments are not necessarily required, but may be optionally selected at least within the scope of the present disclosure.

For example, while the example of stores such as convenience stores has been discussed in the foregoing exemplary embodiments, the technologies according to the exemplary embodiments are applicable to a wide variety of places where recognition of activity situations of persons present in a monitoring area is useful.

While the target moving object is a person in the foregoing exemplary embodiments, the technologies according to the exemplary embodiments are applicable to recognition of activity situations of vehicles such as automobiles, bicycles, and other moving bodies as well as persons.

According to the foregoing embodiments, first activity value obtainer 41 obtains a moving object activity value for each of pixels corresponding to predetermined detection elements plurally divided from a captured image. However, the detection elements are not limited to pixels as the minimum units of the captured image, but may be areas each constituted by a plurality of pixels.

According to the foregoing embodiments, first activity value obtainer 41 mainly counts the number of times of presence of each of detection elements (pixels) within a moving object frame (person frame) to obtain a moving object activity value for each of the detection elements. However, the moving object activity value obtaining process is not limited to this method. For example, such a method may be employed which connects positions of a moving object (such as centers of moving object frame) detected from a captured image (frame) in time series to produce a traffic line, and counts the number of times of passage of the traffic line for each detection element to obtain a moving activity value for each detection element.

According to the foregoing exemplary embodiments, the levels of moving object activity values are expressed in colors in the activity map. However, the levels of the moving object activity values may be expressed by light and shade in monochrome, or may be expressed in figures such as patterns, characters, symbols and the like.

According to the foregoing exemplary embodiments, a graph, a line graph in particular, is displayed as transition information on a transition of the moving object activity value for a target area as illustrated in FIGS. 9 through 21. However, a table may be displayed instead of a graph, or a graph in other shapes such as a bar graph may be displayed.

According to the foregoing exemplary embodiments, target areas are set using rectangular division areas (grids) in the shape of square blocks divided from a captured image as illustrated in FIG. 4. However, the shapes of the division areas are not limited to rectangular shapes, but may be hexagonal shape (honeycomb-shaped), for example.

According to the foregoing exemplary embodiments, a map image and a graph image are arranged side by side in the analysis result output screen as illustrated in FIGS. 10 through 17. However, the map image and the graph image may be displayed in different screens and switched for each display.

According to the foregoing embodiments, an activity map only for a target area set in the monitoring area is displayed. However, an activity map for the whole monitoring area may be displayed.

According to the foregoing embodiments, moving object detector 33 is provided on PC 3 which executes activity map analysis. However, a part or the whole of the function of the moving object detection may be integrated into camera 1 to provide an imaging device having a moving object detection function.

According to the foregoing exemplary embodiments, the processes required for activity map analysis are executed by PC 3 provided in the store. However, the necessary processes may be executed by PC 11 provided in the head office, or cloud computer 21 constituting a cloud computing system as illustrated in FIG. 1. Alternatively, the necessary processes may be shared by a plurality of information processing devices, and information may be exchanged between the plurality of information processing devices via a communication medium such as IP network and LAN. In this case, an activity map analysis system is configured by the plurality of information processing devices sharing the necessary processes.

According to this configuration, it is preferable that a device provided in a store executes at least a moving object detecting process. This configuration reduces the volume of information data required in the remaining processes, thereby decreasing communication loads imposed on an information processing device provided at a place different from the corresponding store, such as PC 11 provided in the head office, even when the information processing device at the different place needs to execute the remaining processes. Accordingly, this configuration facilitates operation of the system in a wide-area network connection mode.

Cloud computer 21 may execute at least a process requiring a large volume of calculations in the processes necessary for activity map analysis, such as the moving object detecting process and the activity value obtaining process. This configuration reduces the calculation volume of the remaining processes, thereby eliminating the necessity of installation of a high-speed information processing device on the user side such as a store. The remaining processes may be executed as an extended function of an information processing device constituting a sales information management device provided in the store. In this case, costs on the user side decrease.

All the necessary processes may be executed by cloud computer 21, or at least the output information creating process included in the necessary processes may be shared by cloud computer 21. This configuration allows display of analysis results on a portable terminal such as smartphone 22 as well as PCs 3 and 11 provided in the store and the head office. Accordingly, this configuration allows checking of analysis results at arbitrary places such as a place a person is visiting, as well as at the store and the head office.

According to the foregoing exemplary embodiments, analysis results are output to monitor 4 of PC 3 provided in the store. However, an output device for receiving analysis results may be provided separately from PC 3. For example, PC 11 provided in the head office and smartphone 22 may be equipped as devices for inspecting analysis results as discussed above, or a function as a device for inspecting analysis results may be added to a sales information management device provided in the store. In addition, analysis results may be printed out by a printer.

According to the foregoing exemplary embodiments, monitor 4 of PC 3 provided in the store displays the analysis condition input screen and the analysis result output screen. However, an information processing device for executing necessary input and output, particularly a portable type information processing device such as a tablet-type terminal may be provided as well as PC 3 for executing the activity map creating process.

The activity map creating device, activity map creating system, and activity map creating method according to the exemplary embodiments of the present disclosure are capable of rapidly recognizing an activity situation of a moving object in an area noted by a user within a monitoring area. The activity map creating device, the activity map creating system, the activity map creating method according to the exemplary embodiments of the present disclosure have an advantage effect in rapid recognition of changes of an activity situation of a moving object with an elapse of time, and are effectively applicable to an activity map creating device, an activity map creating system, an activity map creating method, which analyze the activity situation of the moving object within a monitoring area and output an activity map which visualizes the activity situation of the moving object.

What is claimed is:

1. An activity map creating device that creates an activity situation of a moving object in a monitoring area, and outputs an activity map visualizing the activity situation of the moving object, the device comprising a processor and a memory that stores an instruction, the device further comprising, as a configuration when the processor executes the instruction stored in the memory:

a moving object detector that detects the moving object from a captured image of the monitoring area, and that obtains a moving object frame representing an area where the moving object detected from the captured image of the monitoring area is present;

a first activity value obtainer that obtains a moving object activity value indicating a degree of activity of the moving object for each of predetermined detection elements plurally divided from the captured image based on detection results of the moving object detector, wherein the first activity value obtainer counts a number of times of presence of each of the detection elements within a setting range based on the moving object frame obtained by the moving object detector to obtain a moving object activity value for each of the detection elements;

a target area setter that sets a target area in the monitoring area in accordance with input operation by a user;

a second activity value obtainer that aggregates, in the target area, moving object activity values for the respective detection elements obtained by the first activity value obtainer, to obtain a moving object activity value for the target area;

a map generator that generates the activity map for the target area based on the moving object activity value of the target area obtained by the second activity value obtainer; and an output information generator that generates output information including a map image that displays the activity map generated by the map generator and overlapped on the captured image of the monitoring area.

2. An activity map creating device that creates an activity situation of a moving object in a monitoring area, and outputs an activity map visualizing the activity situation of the moving object, the device comprising a processor and a memory that stores an instruction, the device further comprising, as a configuration when the processor executes the instruction stored in the memory:

a moving object detector that detects the moving object from a captured image of the monitoring area, and that obtains a moving object frame representing an area where the moving object detected from the captured image of the monitoring area is present;

an activity value obtainer that obtains a moving object activity value indicating a degree of activity of the moving object for each of predetermined detection elements plurally divided from the captured image based on detection results of the moving object detector, wherein the first activity value obtainer counts a number of times of presence of each of the detection elements within a setting range based on the moving object frame obtained by the moving object detector to obtain a moving object activity value for each of the detection elements;

a map generator that generates the activity map based on the moving object activity value obtained by the activity value obtainer;

a target area setter that sets a target area in the monitoring area in accordance with input operation by a user;

a transition information generator that generates transition information on a transition of the moving object activity value for the target area based on the moving object activity value obtained by the activity value obtainer; and an output information generator that generates output information including a map image that displays the activity map generated by the map generator and overlapped on the captured image of the monitoring area, and the transition information obtained by the transition information generator.

3. The activity map creating device according to claim 2, wherein the target area setter sets the target area in units of grid corresponding to each of a plurality of grids in square block shapes divided from the captured image in accordance with input operation by the user.

4. The activity map creating device according to claim 3, wherein the map generator generates the activity map in the units of grid set as the target area.

5. The activity map creating device according to claim 2, wherein the map generator generates the activity map in units of pixel of the captured image.

6. The activity map creating device according to claim 2, wherein the target area setter sets the target area in an arbitrary shape designated by the user in accordance with input operation by the user.

7. The activity map creating device according to claim 2, wherein
the activity value obtainer obtains a moving object activity value for each of predetermined detection unit periods, and
the transition information generator averages the moving object activity values for the respective detection unit periods with each of aggregation unit periods to obtain a moving object activity value for each of the aggregation unit periods and creates the transition information on a transition of the moving object activity value for each of the aggregation unit periods.

8. The activity map creating device according to claim 2, wherein the transition information generator generates the transition information on transitions of moving object activity values for the plurality of target areas as accumulated values.

9. The activity map creating device according to claim 2, wherein
the output information generator generates the output information on an analysis result output screen displayed on a display device, and
the analysis result output screen includes a map display portion that displays the activity map, and an operation portion that adjusts date and time of the activity map displayed in the map display portion in accordance with operation by the user.

10. The activity map creating device according to claim 2, wherein the output information generator generates the output information including the map image, and a graph image showing a graph corresponding to the transition information, the map image and the graph image being arranged side by side.

11. An activity map creating system that creates an activity situation of a moving object in a monitoring area, and outputs an activity map visualizing the activity situation of the moving object, the system comprising:

a camera that captures an image of the monitoring area; and a plurality of information processing devices, wherein any one of the plurality of information processing devices includes a processor and a memory that stores an instruction, the any one of the plurality of information processing devices further including, as a configuration when the processor executes the instruction stored in the memory:
a moving object detector that detects the moving object from the captured image of the monitoring area, and that obtains a moving object frame representing an area where the moving object detected from the captured image of the monitoring area is present,
a first activity value obtainer that obtains a moving object activity value indicating a degree of activity of the moving object for each of predetermined detection elements plurally divided from the captured image based on detection results of the moving object detector, wherein the first activity value obtainer counts a number of times of presence of each of the detection elements within a setting range based on the moving object frame obtained by the moving object detector to obtain a moving object activity value for each of the detection elements, a target area setter that sets a target area in the monitoring area in accordance with input operation by a user, a second activity value obtainer that aggregates, in the target area, moving object activity values for the respective detection elements obtained by the first activity value obtainer to obtain a moving object activity value for the target area, a map generator that generates the activity map for the target area based on the moving object activity value of the target area obtained by the second activity value obtainer, and an output information generator that generates output information including a map image that displays the activity map created by the map generator and overlapped on the captured image of the monitoring area.

12. An activity map creating system that creates an activity situation of a moving object in a monitoring area, and outputs an activity map visualizing the activity situation of the moving object, the system comprising:

a camera that captures an image of the monitoring area; and a plurality of information processing devices, wherein any one of the plurality of information processing devices includes a processor and a memory that stores an instruction, the any one of the plurality of information processing devices further including, as a configuration when the processor executes the instruction stored in the memory:

a moving object detector that detects the moving object from the captured image of the monitoring area, and that obtains a moving object frame representing an area where the moving object detected from the captured image of the monitoring area is present, an activity value obtainer that obtains a moving object activity value indicating a degree of activity of the moving object for each of predetermined detection elements plurally divided from the captured image based on detection results of the moving object detector, wherein the first activity value obtainer counts a number of times of presence of each of the detection elements within a setting range based on the moving object frame obtained by the moving object detector to obtain a moving object activity value for each of the detection elements, a map generator that creates the activity map based on the moving object activity value obtained by the activity value obtainer, a target area setter that sets a target area in the monitoring area in accordance with input operation by a user, a transition information generator that generates transition information on a transition of the moving object activity value for the target area based on the moving object activity value obtained by the activity value obtainer, and an output information generator that generates output information having a map image that displays the activity map created by the map generator and overlapped on the captured image of the monitoring area, and the transition information obtained by the transition information generator.

13. An activity map creating method executed by an image processing device for creating an activity situation of a moving object in a monitoring area, and outputting an activity map visualizing the activity situation of the moving object, the method comprising:

detecting a moving object from a captured image of the monitoring area;

obtaining a moving object activity value indicating a degree of activity of the moving object for each of predetermined detection elements plurally divided from the captured image based on detection results thus obtained;

obtaining a moving object frame representing an area where the moving object detected from the captured image of the monitoring area is present;

counting a number of times of presence of each of the detection elements within a setting range based on the moving object frame obtained by the moving object detector to obtain a moving object activity value for each of the detection elements;

setting a target area within the monitoring area in accordance with input operation by a user;

aggregating, in the target area, moving object activity values for the respective detection elements to obtain a moving object activity value for the target area;

generating the activity map for the target area based on the moving object activity value of the target area thus obtained; and generating output information including a map image that displays the activity map thus generated and overlapped on the captured image of the monitoring area.

14. An activity map creating method executed by an image processing device for creating an activity situation of a moving object in a monitoring area, and outputting an activity map visualizing the activity situation of the moving object, the method comprising:

detecting a moving object from a captured image of the monitoring area;

obtaining a moving object activity value indicating a degree of activity of the moving object for each of predetermined detection elements plurally divided from the captured image based on detection results thus obtained;

obtaining a moving object frame representing an area where the moving object detected from the captured image of the monitoring area is present;

counting a number of times of presence of each of the detection elements within a setting range based on the moving object frame obtained by the moving object detector to obtain a moving object activity value for each of the detection elements* generating the activity map based on the moving object activity value thus obtained;

setting a target area in the monitoring area in accordance with input operation by a user;

generating transition information on a transition of the moving object activity value for the target area based on the moving object activity value; and generating output information that has a map image that displays the activity map overlapped on the captured image of the monitoring area, and the transition information.

* * * * *